United States Patent
Ransom

(10) Patent No.: US 11,459,521 B2
(45) Date of Patent: Oct. 4, 2022

(54) LUBRICANT COMPOSITION AND DISPERSANTS THEREFOR HAVING A BENEFICIAL EFFECT ON OXIDATION STABILITY

(71) Applicant: Afton Chemical Corporation, Richmond, VA (US)

(72) Inventor: Paul Ransom, Marsden (GB)

(73) Assignee: AFTON CHEMICAL COPORATION, Richmond, VA (US)

( * ) Notice: Subject to any disclaimer, the term of this patent is extended or adjusted under 35 U.S.C. 154(b) by 0 days.

(21) Appl. No.: 16/000,362

(22) Filed: Jun. 5, 2018

(65) Prior Publication Data

US 2019/0367835 A1    Dec. 5, 2019

(51) Int. Cl.

| C10M 133/16 | (2006.01) |
| C10M 145/16 | (2006.01) |
| C08L 33/06 | (2006.01) |
| C08L 79/02 | (2006.01) |
| C10M 133/04 | (2006.01) |
| C10N 40/25 | (2006.01) |

(52) U.S. Cl.
CPC ......... *C10M 145/16* (2013.01); *C08L 33/064* (2013.01); *C08L 79/02* (2013.01); *C10M 133/04* (2013.01); *C08F 2500/02* (2013.01); *C08F 2800/20* (2013.01); *C10M 2201/06* (2013.01); *C10N 2040/25* (2013.01)

(58) Field of Classification Search
CPC .............. C10M 145/16; C10M 133/04; C10M 2201/06; C10M 133/16; C10M 141/06; C10M 2207/023; C10M 2215/064; C10M 2215/086; C10M 133/56; C10M 169/042; C10M 2215/28; C10M 2223/045; C10M 169/04; C10M 125/04; C10M 159/005; C10M 159/12; C08L 79/02; C08L 33/064; C08F 2500/02; C08F 2800/20; C10N 2040/25; C10N 2010/12; C10N 2020/04; C10N 2030/10; C10N 2030/041; C10N 2030/78; C10N 2030/04; C10L 1/1832; C10L 1/2222; C10L 1/224; C10L 1/301; C10L 10/00; C10L 10/04; C10L 10/08; C10L 2230/081; C10L 2270/026
See application file for complete search history.

(56) References Cited

U.S. PATENT DOCUMENTS

| 3,178,663 A | 4/1965 | Kahn |
| 3,189,544 A | 6/1965 | Ratner et al. |
| 3,215,707 A | 11/1965 | Rense |
| 3,256,185 A | 6/1966 | Le Suer |
| 3,278,550 A | 10/1966 | Norman et al. |
| 3,312,619 A | 4/1967 | Vineyard |
| 3,356,702 A | 12/1967 | Farmer et al. |
| 3,366,569 A | 1/1968 | Norman et al. |
| 3,403,102 A | 9/1968 | Le Suer |
| 3,458,530 A | 7/1969 | Siegel et al. |
| 3,473,205 A | 10/1969 | Zocher |
| 3,502,677 A | 3/1970 | Le Suer |
| 3,509,051 A | 4/1970 | Farmer et al. |
| 3,546,243 A | 12/1970 | Coupland |
| 3,634,515 A | 1/1972 | Piasek et al. |
| 3,708,522 A | 1/1973 | Le Suer |
| 3,749,695 A | 7/1973 | de Vries |
| 3,859,318 A | 1/1975 | Lesuer |
| 3,865,813 A | 2/1975 | Gergel |
| 3,954,639 A | 5/1976 | Liston |
| 4,098,705 A | 7/1978 | Sakurai et al. |
| 4,152,499 A | 5/1979 | Boerzel et al. |
| 4,164,473 A | 8/1979 | Coupland et al. |
| 4,178,258 A | 12/1979 | Papay et al. |
| 4,234,435 A | 11/1980 | Meinhardt et al. |
| 4,259,195 A | 3/1981 | King et al. |
| 4,261,843 A | 4/1981 | King et al. |

(Continued)

FOREIGN PATENT DOCUMENTS

| CN | 1782049 A | * | 6/2006 | |
| CN | 1782049 A | | 6/2006 | |
| CN | 107400547 A | | 11/2017 | |
| EP | 0612839 A1 | | 8/1994 | |
| EP | 1136496 A1 | | 9/2001 | |
| EP | 1136497 A1 | | 9/2001 | |
| EP | 1661969 A1 | * | 5/2006 | .......... C10M 163/00 |
| EP | 1661969 A1 | | 5/2006 | |

(Continued)

OTHER PUBLICATIONS

Extended European Search Report for corresponding European Application No. 19177776.2; dated Nov. 4, 2019 (7 pages).
Invitation to Respond to Written Opinion for corresponding Singaporean application No. 10201905010T; dated Nov. 26, 2021 (10 pages).

(Continued)

*Primary Examiner* — Taiwo Oladapo
(74) *Attorney, Agent, or Firm* — Mendelsohn Dunleavy, P.C.

(57) ABSTRACT

A lubricant composition having greater than 50 percent by weight of a base oil, a dispersant composition comprising: i) a first dispersant comprising one or more reaction products of at least one polyisobutenyl succinic acid or anhydride having a polyisobutenyl group with a number average molecular weight that is less than or equal to 1300, and at least one polyamine; and ii) a second dispersant comprising one or more reaction products of at least one polyisobutenyl succinic acid or anhydride having a polyisobutenyl group with a number average molecular weight greater than 1300, and at least one polyamine; and at least one ashless antioxidant; and wherein a weight ratio of the second dispersant to the dispersant composition is 0.66:1 to 1:1 or a ratio of the weight percentages of nitrogen contributed by the second dispersant to nitrogen of the dispersant composition is 0.62:1 to 1:1.

19 Claims, No Drawings

(56) References Cited

U.S. PATENT DOCUMENTS

| | | |
|---|---|---|
| 4,263,152 A | 4/1981 | King et al. |
| 4,265,773 A | 5/1981 | deVries et al. |
| 4,266,945 A | 5/1981 | Kam |
| 4,272,387 A | 6/1981 | King et al. |
| 4,283,295 A | 8/1981 | deVries et al. |
| 4,285,822 A | 8/1981 | deVries et al. |
| 4,362,633 A | 12/1982 | Spence et al. |
| 4,369,119 A | 1/1983 | deVries et al. |
| 4,395,343 A | 7/1983 | de Vries et al. |
| 4,402,840 A | 9/1983 | deVries et al. |
| 4,466,901 A | 8/1984 | Hunt et al. |
| 4,579,675 A | 4/1986 | Sawicki et al. |
| 4,612,132 A | 9/1986 | Wollenberg et al. |
| 4,614,522 A | 9/1986 | Buckley |
| 4,614,603 A | 9/1986 | Wollenberg |
| 4,617,137 A | 10/1986 | Plavac |
| 4,617,138 A | 10/1986 | Wollenberg |
| 4,645,515 A | 2/1987 | Wollenberg |
| 4,647,390 A | 3/1987 | Buckley, III et al. |
| 4,648,886 A | 3/1987 | Buckley, III et al. |
| 4,648,980 A | 3/1987 | Erdman |
| 4,652,387 A | 3/1987 | Andress, Jr. et al. |
| 4,668,246 A | 5/1987 | Wollenberg |
| 4,670,170 A | 6/1987 | Wollenberg |
| 4,692,256 A | 9/1987 | Umemura et al. |
| 4,765,918 A | 8/1988 | Love et al. |
| 4,863,624 A | 9/1989 | Emert et al. |
| 4,889,647 A | 12/1989 | Rowan et al. |
| 4,948,386 A | 8/1990 | Sung et al. |
| 4,963,275 A | 10/1990 | Gutierrez et al. |
| 4,966,719 A | 10/1990 | Coyle et al. |
| 4,971,598 A | 11/1990 | Andress et al. |
| 4,971,711 A | 11/1990 | Lundberg et al. |
| 4,978,464 A | 12/1990 | Coyle et al. |
| 4,990,271 A | 2/1991 | Francis |
| 4,995,996 A | 2/1991 | Coyle et al. |
| 5,021,173 A | 6/1991 | Waddoups et al. |
| 5,026,495 A | 6/1991 | Emert et al. |
| 5,053,150 A | 10/1991 | Emert et al. |
| 5,085,788 A | 2/1992 | Emert et al. |
| 5,118,432 A | 6/1992 | Emert et al. |
| 5,137,647 A | 8/1992 | Karol |
| 5,158,696 A | 10/1992 | Emert et al. |
| 5,217,634 A | 6/1993 | Emert et al. |
| 5,230,817 A | 7/1993 | Lundberg et al. |
| 5,241,003 A | 8/1993 | Degonia et al. |
| 5,256,325 A | 10/1993 | Emert et al. |
| 5,273,668 A | 12/1993 | Emert et al. |
| 5,282,991 A | 2/1994 | Waddoups et al. |
| 5,328,622 A | 7/1994 | Emert et al. |
| 5,334,321 A | 8/1994 | Harrison et al. |
| 5,399,273 A | 3/1995 | Emert et al. |
| 5,412,130 A | 5/1995 | Karol |
| 5,482,519 A | 1/1996 | Emert et al. |
| 5,567,344 A | 10/1996 | Emert et al. |
| 5,578,237 A | 11/1996 | Emert et al. |
| 5,629,434 A | 5/1997 | Cusumano et al. |
| 5,739,355 A | 4/1998 | Gateau et al. |
| 5,883,057 A | 3/1999 | Roell, Jr. et al. |
| 6,051,537 A | 4/2000 | Emert et al. |
| 6,103,674 A | 8/2000 | Nalesnik et al. |
| 6,117,826 A | 9/2000 | Baranski et al. |
| 6,127,321 A | 10/2000 | Emert et al. |
| 6,323,276 B2 | 11/2001 | Horowitz et al. |
| 6,734,148 B2 | 5/2004 | Bell et al. |
| 6,743,757 B2 | 6/2004 | Bell et al. |
| 7,214,649 B2 | 5/2007 | Loper et al. |
| 7,645,726 B2 | 1/2010 | Loper |
| 7,732,390 B2 | 6/2010 | Kadkhodayan et al. |
| 7,897,696 B2 | 3/2011 | Huang et al. |
| 8,048,831 B2 | 11/2011 | Loper |
| 2003/0148897 A1 | 8/2003 | Bell et al. |
| 2003/0148898 A1* | 8/2003 | Bell ............... C10M 133/56 508/192 |
| 2007/0049503 A1* | 3/2007 | Stokes ............ C10M 163/00 508/192 |
| 2010/0075876 A1 | 3/2010 | Claydon |
| 2011/0003723 A1* | 1/2011 | Teshima ......... C10M 135/00 508/389 |
| 2011/0030269 A1* | 2/2011 | Chasan .......... C10M 133/12 44/388 |
| 2011/0245120 A1 | 10/2011 | Bertram et al. |
| 2015/0094244 A1 | 4/2015 | Yamaguchi et al. |
| 2017/0029738 A1 | 2/2017 | Emert et al. |
| 2017/0335228 A1 | 11/2017 | Campbell et al. |
| 2018/0066203 A1 | 3/2018 | Dance et al. |

FOREIGN PATENT DOCUMENTS

| | | |
|---|---|---|
| GB | 1065595 | 4/1967 |
| GB | 2140811 A | 12/1984 |

OTHER PUBLICATIONS

Office Action for corresponding Chinese application No. 201910475338; dated Feb. 25, 2022 (23 pages) Machine Translation.

* cited by examiner

LUBRICANT COMPOSITION AND DISPERSANTS THEREFOR HAVING A BENEFICIAL EFFECT ON OXIDATION STABILITY

TECHNICAL FIELD

The disclosure relates to lubricant compositions and, more specifically but not exclusively, to additive compositions for improving or maintaining the soot or sludge handling characteristics and piston cleanliness of an engine lubricant composition, while improving oxidation stability.

BACKGROUND

This section introduces aspects that may help facilitate a better understanding of the disclosure. Accordingly, the statements of this section are to be read in this light and are not to be understood as admissions about what is in the prior art or what is not in the prior art.

An engine oil lubricant is typically composed of a base oil and an additive package. The additive package often includes one or more detergents and dispersants that help to suspend insoluble contaminants in the bulk lubricant and keep the engine surfaces relatively clean. A dispersant is commonly distinguished from a detergent in that a typical dispersant is metal-free and is significantly higher in molecular weight than the organic portion of the detergent.

Another important characteristic of an engine oil lubricant is oxidation stability, e.g., because oxidation can lead to a viscosity increase over time and cause formation of sludge, resin, varnish, and/or hard deposits. Hence, the additive package typically contains oxidation inhibitors that tend to retard the formation of highly reactive oxidants, such as hydroperoxides and radicals, thereby reducing the overall rate of oxidation. Once the oxidation inhibitors are weakened or depleted, degradation of the engine oil lubricant can occur rather rapidly. Several methods can be used to quantify the oxidation stability of an engine oil lubricant, such as measuring the time until a specified increase in the viscosity or acid number occurs.

The use of biodiesel fuels, which typically contain significant quantities of unsaturated fatty acid esters, can significantly alter the behavior of engine oil lubricants compared to that exhibited when only petroleum-derived diesel fuel is used. Because biodiesel fuel is typically much less volatile than petroleum-derived diesel fuel, it has a tendency to accumulate in the crankcase due to the non-combusted fuel getting past the piston rings, thereby diluting and contaminating the engine oil lubricant. The latter is a serious concern, e.g., because unsaturated fatty acid esters have relatively poor oxidative stability, and their presence in the crankcase can cause faster lubricant degradation and thickening. The extent of adverse effects caused by the use of biodiesel fuels tends to depend on the rate of contaminant accumulation, biodiesel concentration in the fuel, engine operating conditions, and chemical composition of the lubricant. It is therefore desirable to provide engine oil lubricants and methods of using the same that at least partially mitigate these and possibly other adverse effects of the use of biodiesel fuels.

SUMMARY AND TERMS

As set forth above, the present disclosure relates to a lubricant composition and method of lubricating an engine fueled with biodiesel, with this lubricant composition.

The lubricant composition comprises:
greater than 50 percent by weight of a base oil, based on a total weight of the lubricant composition;
a dispersant composition including at least:
i) a first dispersant containing one or more reaction products of at least one polyisobutenyl succinic acid or anhydride having a polyisobutenyl group with a number average molecular weight that is less than or equal to about 1300, and at least one polyamine; and
ii) a second dispersant containing one or more reaction products of at least one polyisobutenyl succinic acid or anhydride having a polyisobutenyl group with a number average molecular weight greater than about 1300, and at least one polyamine; and
at least one ashless antioxidant;
wherein a weight ratio of the second dispersant to a total weight of the dispersant composition ranges from about 0.66:1 to 1:1. The first dispersant is sometimes hereinafter referred to as "dispersant (A)", and the second dispersant is sometimes hereinafter referred to as "dispersant (B)".

In the foregoing embodiment, the ashless antioxidant may include at least one of a sulfurized antioxidant, a phenolic antioxidant, and an aminic antioxidant. In the foregoing embodiment, the antioxidant may include the phenolic antioxidant and the aminic antioxidant in a ratio of from about 0.3:0.8 to about 0.8:0.3, or more preferably, in a ratio of 0.4:0.8 to 0.8:0.4, or more preferably in a ratio of 0.5:0.8 to 0.8:0.5, or even more preferably a ratio of from 0.5:0.8 to 0.7:0.8, or most preferably a ratio of from 0.5:0.8. In each of the foregoing embodiments, the ashless antioxidant may be substantially free of copper.

In each of the foregoing embodiments, the second dispersant may contain two or more dispersants each having a number average molecular weight greater than 1300.

In each of the foregoing embodiments, the lubricant composition may further include a molybdenum containing compound.

In each of the foregoing embodiments, a ratio of the number average molecular weight of the second dispersant to the number average molecular weight of the dispersant composition may be from about 0.72:1 to 1:1. In each of the foregoing embodiments, the second dispersant may include at least one dispersant obtained from a polyisobutenyl succinic acid or anhydride having a polyisobutenyl group with a number average molecular weight between about 1300 and about 2300. In the foregoing embodiment, the second dispersant may comprise from about 0.1 wt. % to about 10 wt. %, based on the total weight of the lubricant composition. In each of the foregoing embodiments, the total dispersant comprises about 0.1 wt. % to about 20 wt. %, based on the total weight of the lubricant composition.

In another embodiment, the present disclosure relates to a method of lubricating an engine fueled with biodiesel, comprising supplying the lubricant composition of any of the foregoing embodiments to the engine, and wherein the lubricant composition is contaminated with biodiesel during operation of the engine.

In an alternative embodiment, the present disclosure relates to a lubricant composition comprising:
greater than 50 percent by weight of a base oil, based on a total weight of the lubricant composition;
a dispersant composition comprising:
i) a first dispersant comprising one or more reaction products of at least one polyisobutenyl succinic acid or anhydride having a polyisobutenyl group with a number average molecular weight that is less than or equal to 1300, and at least one polyamine;

ii) a second dispersant comprising one or more reaction products of at least one polyisobutenyl succinic acid or anhydride having a polyisobutenyl group with a number average molecular weight greater than 1300, and at least one polyamine; and at least one antioxidant;

wherein a ratio of the weight percentage of nitrogen contributed by the second dispersant to the weight percentage of nitrogen of the dispersant composition is from about 0.62:1 to 1:1.

In an alternative embodiment, the present disclosure relates to a lubricant composition comprising:
greater than 50 percent by weight of a base oil, based on a total weight of the lubricant composition; at least one antioxidant substantially free of copper; and
a dispersant composition including:
i) a first dispersant containing one or more reaction products of at least one polyisobutenyl succinic acid or anhydride having a polyisobutenyl group with a number average molecular weight that is less than or equal to about 1300, and at least one polyamine; and
ii) a second dispersant containing one or more reaction products of at least one polyisobutenyl succinic acid or anhydride having a polyisobutenyl group with a number average molecular weight greater than about 1300, and at least one polyamine;
wherein the weight ratio of the second dispersant to the total weight of the dispersant composition ranges from about 0.42:1 to 1:1.

In the foregoing alternative embodiment, the antioxidant may comprise a phenolic antioxidant, an aminic antioxidant, and a molybdenum-containing antioxidant in a ratio of approximately 0.5:1:0.1.

In each of the foregoing alternative embodiments, a ratio of the number average molecular weight of the second dispersant to the number average molecular weight of the dispersant composition may be from about 0.5:1 to 1:1.

In each of the foregoing alternative embodiments, the second dispersant may comprise at least one dispersant obtained from a polyisobutenyl succinic acid or anhydride having a polyisobutenyl group with a number average molecular weight between about 1300 and about 2300.

In each of the foregoing alternative embodiments, the second dispersant may comprise from about 0.1 wt. % to about 10 wt. %, based on the total weight of the lubricant composition. In each of the foregoing alternative embodiments, the total dispersant comprises about 0.1 wt. % to about 20 wt. %, based on the total weight of the lubricant composition.

In a second alternative embodiment, the present disclosure relates to a lubricant composition comprising:
greater than 50 percent by weight of a base oil, based on a total weight of the lubricant composition; at least one of an antioxidant substantially free of copper; and
a dispersant composition comprising:
i) a first dispersant comprising one or more reaction products of at least one polyisobutenyl succinic acid or anhydride having a polyisobutenyl group with a number average molecular weight that is less than or equal to about 1300, and at least one polyamine; and
ii) a second dispersant comprising one or more reaction products of at least one polyisobutenyl succinic acid or anhydride having a polyisobutenyl group with a number average molecular weight greater than about 1300, and at least one polyamine;

wherein a ratio of the weight percentage of nitrogen contributed by the second dispersant to the weight percentage of nitrogen of the dispersant composition is from about 0.40:1 to 1:1

In the foregoing second alternative embodiment, the antioxidant may comprise a phenolic antioxidant, an aminic antioxidant, and a molybdenum-containing antioxidant in a ratio of approximately 0.5:1:0.1.

In each of the foregoing second alternative embodiments, a ratio of the number average molecular weight of the second dispersant to the number average molecular weight of the dispersant composition may be from about 0.5:1 to 1:1.

In each of the foregoing second alternative embodiments, the second dispersant may comprise at least one dispersant obtained from a polyisobutenyl succinic acid or anhydride having a polyisobutenyl group with a number average molecular weight between about 1300 and about 2300.

In each of the foregoing alternative embodiments, the second dispersant may comprise from about 0.1 wt. % to about 10 wt. %, based on the total weight of the lubricant composition. In each of the foregoing alternative embodiments, the total dispersant comprises about 0.1 wt. % to about 20 wt. %, based on the total weight of the lubricant composition.

In another embodiment, the present disclosure relates to a method of lubricating an engine fueled with biodiesel, the method comprising supplying a lubricant composition to an engine wherein the lubricant composition is contaminated with the biodiesel during operation of the engine; wherein the lubricant composition may be any of the foregoing alternative embodiments.

The following definitions of terms are provided in order to clarify the meanings of certain terms as used herein.

The terms "oil composition," "lubrication composition," "lubricating oil composition," "lubricating oil," "lubricant composition," "lubricating composition," "fully formulated lubricant composition," "lubricant," "crankcase oil," "crankcase lubricant," "engine oil," "engine lubricant," "motor oil," and "motor lubricant" are considered synonymous, fully interchangeable terminology referring to the finished lubrication product comprising a major amount of a base oil plus a minor amount of an additive composition.

As used herein, the terms "additive package," "additive concentrate," "additive composition," "engine oil additive package," "engine oil additive concentrate," "crankcase additive package," "crankcase additive concentrate," "motor oil additive package," "motor oil concentrate," are considered synonymous, fully interchangeable terminology referring the portion of the lubricating oil composition excluding the major amount of base oil stock mixture. The additive package may or may not include the viscosity index improver or pour point depressant.

The term "overbased" relates to metal salts, such as metal salts of sulfonates, carboxylates, salicylates, and/or phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, salicylates, and/or phenols.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having a predominantly hydrocarbon character. Each hydrocarbyl group is independently selected from hydrocarbon substituents, and substituted hydrocarbon substituents containing one or more of halo groups, hydroxyl groups, alkoxy groups, mercapto groups, nitro groups, nitroso groups, amino groups, pyridyl groups, furyl groups, imidazolyl groups, oxygen and nitrogen, and wherein no more than two non-hydrocarbon substituents are present for every ten carbon atoms in the hydrocarbyl group.

As used herein, the term "percent by weight", unless expressly stated otherwise, means the percentage the recited component represents to the weight of the entire composition.

The terms "soluble," "oil-soluble," or "dispersible" used herein may, but does not necessarily, indicate that the compounds or additives are soluble, dissolvable, miscible, or capable of being suspended in the oil in all proportions. The foregoing terms do mean, however, that they are, for instance, soluble, suspendable, dissolvable, or stably dispersible in oil to an extent sufficient to exert their intended effect in the environment in which the oil is employed. Moreover, the additional incorporation of other additives may also permit incorporation of higher levels of a particular additive, if desired.

The term "TBN" as employed herein is used to denote the Total Base Number in mg KOH/g as measured by the method of, for example, ASTM D2896 or ASTM D4739 or DIN 51639-1 or ISO 3771.

The term "alkyl" as employed herein refers to straight, branched, cyclic, and/or substituted saturated chain moieties of from about 1 to about 100 carbon atoms.

The term "alkenyl" as employed herein refers to straight, branched, cyclic, and/or substituted unsaturated chain moieties of from about 3 to about 10 carbon atoms.

The term "aryl" as employed herein refers to single and multi-ring aromatic compounds that may include alkyl, alkenyl, alkylaryl, amino, hydroxyl, alkoxy, halo substituents, and/or heteroatoms including, but not limited to, nitrogen, oxygen, and sulfur.

Lubricants, combinations of components, or individual components of the present description may be suitable for use in various types of internal combustion engines. Suitable engine types may include, but are not limited to heavy duty diesel, passenger car, light duty diesel, medium speed diesel, hybrid engines or marine engines. An internal combustion engine may be a diesel fueled engine, a gasoline fueled engine, a natural gas fueled engine, a bio-fueled engine, a mixed diesel/biofuel fueled engine, a mixed gasoline/biofuel fueled engine, an alcohol fueled engine, a mixed gasoline/alcohol fueled engine, a compressed natural gas (CNG) fueled engine, or mixtures thereof. A diesel engine may be a compression ignited engine. A gasoline engine may be a spark-ignited engine. An internal combustion engine may also be used in combination with an electrical or battery source of power. An engine so configured is commonly known as a hybrid engine. Hybrid engines may be gasoline fueled homogeneous charge compression ignition (HCCI) engines, diesel HCCI engines, gasoline homogeneous charge compression ignition-electric hybrid engines, diesel-electric hybrid vehicle, and gasoline-electric hybrid vehicle.

The internal combustion engine may be a 2-stroke, 4-stroke, or rotary engine. Suitable internal combustion engines include marine diesel engines (such as inland marine), aviation piston engines, low-load diesel engines, and motorcycle, automobile, locomotive, and truck engines.

The internal combustion engine may contain components of one or more of an aluminum-alloy, lead, tin, copper, cast iron, magnesium, ceramics, stainless steel, composites, and/or mixtures thereof. The components may be coated, for example, with a diamond-like carbon coating, a lubricated coating, a phosphorus-containing coating, molybdenum-containing coating, a graphite coating, a nano-particle-containing coating, and/or mixtures thereof. The aluminum-alloy may include aluminum silicates, aluminum oxides, or other ceramic materials. In one embodiment the aluminum-alloy is an aluminum-silicate surface. As used herein, the term "aluminum alloy" is intended to be synonymous with "aluminum composite" and to describe a component or surface comprising aluminum and another component intermixed or reacted on a microscopic or nearly microscopic level, regardless of the detailed structure thereof. This would include any conventional alloys with metals other than aluminum as well as composite or alloy-like structures with non-metallic elements or compounds such with ceramic-like materials.

The lubricating oil composition for an internal combustion engine may be suitable for any engine lubricant irrespective of the sulfur, phosphorus, or sulfated ash (ASTM D874) content. The sulfur content of the engine oil lubricant may be about 1 wt. % or less, or about 0.8 wt. % or less, or about 0.5 wt. % or less, or about 0.3 wt. % or less, or about 0.2 wt. % or less. In one embodiment the sulfur content may be in the range of about 0.001 wt. % to about 0.5 wt. %, or about 0.01 wt. % to about 0.3 wt. %. The phosphorus content may be about 0.2 wt. % or less, or about 0.1 wt. % or less, or about 0.085 wt. % or less, or about 0.08 wt. % or less, or even about 0.06 wt. % or less, or about 0.055 wt. % or less, or about 0.05 wt. % or less. In one embodiment the phosphorus content may be about 50 ppm to about 1000 ppm, or about 325 ppm to about 850 ppm. The total sulfated ash content may be about 2 wt. % or less, or about 1.5 wt. % or less, or about 1.1 wt. % or less, or about 1 wt. % or less, or about 0.8 wt. % or less, or about 0.5 wt. % or less. In one embodiment the sulfated ash content may be about 0.05 wt. % to about 0.9 wt. %, or about 0.1 wt. % or about 0.2 wt. % to about 0.45 wt. %. In another embodiment, the sulfur content may be about 0.4 wt. % or less, the phosphorus content may be about 0.08 wt. % or less, and the sulfated ash is about 1 wt. % or less. In yet another embodiment the sulfur content may be about 0.3 wt. % or less, the phosphorus content is about 0.05 wt. % or less, and the sulfated ash may be about 0.8 wt. % or less.

In one embodiment the lubricating oil composition is an engine oil, wherein the lubricating oil composition may have (i) a sulfur content of about 0.5 wt. % or less, (ii) a phosphorus content of about 0.1 wt. % or less, and (iii) a sulfated ash content of about 1.5 wt. % or less.

In one embodiment the lubricating oil composition is suitable for a 2-stroke or a 4-stroke marine diesel internal combustion engine. In one embodiment the marine diesel combustion engine is a 2-stroke engine. In some embodiments, the lubricating oil composition is not suitable for a 2-stroke or a 4-stroke marine diesel internal combustion engine for one or more reasons, including but not limited to, the high sulfur content of fuel used in powering a marine engine and the high TBN required for a marine-suitable engine oil (e.g., above about 40 TBN in a marine-suitable engine oil).

In some embodiments, the lubricating oil composition is suitable for use with engines powered by low sulfur fuels, such as fuels containing about 1 to about 5% sulfur. Highway vehicle fuels contain about 15 ppm sulfur (or about 0.0015% sulfur).

Low speed diesel typically refers to marine engines, medium speed diesel typically refers to locomotives, and high speed diesel typically refers to highway vehicles. The lubricating oil composition may be suitable for only one of these types or all.

Further, lubricants of the present description may be suitable to meet one or more industry specification requirements such as ILSAC GF-3, GF-4, GF-5, GF-6, PC-11, CF, CF-4, CH-4, CI-4, CJ-4, API SG, SJ, SL, SM, SN, ACEA A1/B1, A2/B2, A3/B3, A3/B4, A5/B5, C1, C2, C3, C4, C5, E4/E6/E7/E9, Euro 5/6, Jaso DL-1, Low SAPS, Mid SAPS, or original equipment manufacturer specifications such as Dexos™ 1, Dexos™ 2, MB-Approval 229.1, 229.3, 229.5, 229.31, 229.51, 229.52, 229.6, 229.71, 226.5, 226.51, 228.0/.1, 228.2/.3, 228.31, 228.5, 228.51, 228.61, VW 501.01, 502.00, 503.00/503.01, 504.00, 505.00, 505.01, 506.00/506.01, 507.00, 508.00, 509.00, 508.88, 509.99, BMW Longlife-01, Longlife-01 FE, Longlife-04, Longlife-12 FE, Longlife-14 FE+, Longlife-17 FE+, Porsche A40, C30, Peugeot Citroën Automobiles B71 2290, B71 2294, B71 2295, B71 2296, B71 2297, B71 2300, B71 2302, B71 2312, B71 2007, B71 2008, Renault RN0700, RN0710, RN0720, Ford WSS-M2C153-H, WSS-M2C930-A, WSS-M2C945-A, WSS-M2C913A, WSS-M2C913-B, WSS-M2C913-C, WSS-M2C913-D, WSS-M2C948-B, WSS-M2C948-A, GM 6094-M, Chrysler MS-6395, Fiat 9.55535 G1, G2, M2, N1, N2, Z2, S1, S2, S3, S4, T2, DS1, DSX, GH2, GS1, GSX, CR1, Jaguar Land Rover STJLR.03.5003, STJLR.03.5004, STJLR.03.5005, STJLR.03.5006, STJLR.03.5007, STJLR.51.5122 or any past or future PCMO/or HDD specifications not mentioned herein. In some embodiments for passenger car motor oil (PCMO) applications, the amount of phosphorus in the finished fluid is 1000 ppm or less or 900 ppm or less or 800 ppm or less.

Other hardware may not be suitable for use with the disclosed lubricant. A "functional fluid" is a term which encompasses a variety of fluids including but not limited to tractor hydraulic fluids, power transmission fluids including automatic transmission fluids, continuously variable transmission fluids and manual transmission fluids, hydraulic fluids, including tractor hydraulic fluids, some gear oils, power steering fluids, fluids used in wind turbines, compressors, some industrial fluids, and fluids related to power train components. It should be noted that within each of these fluids such as, for example, automatic transmission fluids, there are a variety of different types of fluids due to the various transmissions having different designs which have led to the need for fluids of markedly different functional characteristics. This is contrasted by the term "lubricating fluid" which is not used to generate or transfer power.

With respect to tractor hydraulic fluids, for example, these fluids are all-purpose products used for all lubricant applications in a tractor except for lubricating the engine. These lubricating applications may include lubrication of gearboxes, power take-off and clutch(es), rear axles, reduction gears, wet brakes, and hydraulic accessories.

When the functional fluid is an automatic transmission fluid, the automatic transmission fluids must have enough friction for the clutch plates to transfer power. However, the friction coefficient of fluids has a tendency to decline due to the temperature effects as the fluid heats up during operation. It is important that the tractor hydraulic fluid or automatic transmission fluid maintain its high friction coefficient at elevated temperatures, otherwise brake systems or automatic transmissions may fail. This is not a function of an engine oil.

Tractor fluids, and for example Super Tractor Universal Oils (STUOs) or Universal Tractor Transmission Oils (UTTOs), may combine the performance of engine oils with transmissions, differentials, final-drive planetary gears, wet-brakes, and hydraulic performance. While many of the additives used to formulate a UTTO or a STUO fluid are similar in functionality, they may have deleterious effect if not incorporated properly. For example, some anti-wear and extreme pressure additives used in engine oils can be extremely corrosive to the copper components in hydraulic pumps. Detergents and dispersants used for gasoline or diesel engine performance may be detrimental to wet brake performance. Friction modifiers specific to quiet wet brake noise, may lack the thermal stability required for engine oil performance. Each of these fluids, whether functional, tractor, or lubricating, are designed to meet specific and stringent manufacturer requirements.

The present disclosure provides novel lubricating oil blends formulated for use as automotive crankcase lubricants. The present disclosure provides novel lubricating oil blends formulated for use as 2T and/or 4T motorcycle crankcase lubricants. Embodiments of the present disclosure may provide lubricating oils suitable for crankcase applications and having improvements in the following characteristics: air entrainment, alcohol fuel compatibility, antioxidancy, antiwear performance, biofuel compatibility, foam reducing properties, friction reduction, fuel economy, pre-ignition prevention, rust inhibition, sludge and/or soot dispersability, piston cleanliness, deposit formation, and water tolerance.

Engine oils of the present disclosure may be formulated by the addition of one or more additives, as described in detail below, to an appropriate base oil formulation. The additives may be combined with a base oil in the form of an additive package (or concentrate) or, alternatively, may be combined individually with a base oil (or a mixture of both). The fully formulated engine oil may exhibit improved performance properties, based on the additives added and their respective proportions.

Unless stated otherwise, all percentages are in weight percent and all molecular weights are number average molecular weights.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Example embodiments disclosed herein provide lubricant compositions that may be particularly useful for crankcase-lubricated engines fueled by liquid fuel that has a biodiesel component therein. Some of the benefits of the use of such lubricant compositions in such engines may include, but are not limited to one or more of the following: (i) improved oxidation resistance; (ii) improved viscosity characteristics; (iii) longer intervals between scheduled lubricant flushes; and (iv) reduced rate of sludge and deposit formation. At least some of these benefits arise due to the presence, in the lubricant compositions, of one or more dispersants described herein. Some embodiments may also be useful for crankcase-lubricated engines fueled by petroleum-derived diesel fuel that does not have a biodiesel component therein.

As used herein, the term "biodiesel" refers to a fuel containing a certain fraction of fatty acid alkyl esters derived from an animal source and/or a plant source. In the accepted biodiesel nomenclature, the fuel grade is indicated by the symbol "Bxx," wherein the letter B indicates the presence of a biologically derived fuel component, and the number xx denotes the percentage of biologically derived fuel in the composition. For example, the fuel labeled B30 contains 30% of biologically derived fuel and 70% of petroleum-derived diesel fuel. Embodiments disclosed herein may be particularly useful for grade B2 fuels and higher grades, possibly up to grade B100 fuel, which is substantially pure biodiesel.

Biodiesel fuels can be derived, e.g., from animal fats, plant seeds, and/or vegetable oils, as known in the pertinent art. The resulting fatty acid esters may include methyl, ethyl, propyl, and isopropyl esters. The corresponding precursor fatty acid may be a relatively pure, single-component acid in terms of carbon-chain length, branching, and the like, or may be a mixture of different fatty acids typical of the particular animal or plant source. For example, a popular type of biodiesel fuel includes the esters of naturally occurring fatty acids of rapeseed oil that can be prepared, e.g., by transesterifying a natural fat or oil with an aliphatic alcohol having one to three carbon atoms. Other types of biodiesel fuel may include the esters of soybean oil, sunflower oil, coconut oil, corn oil, olive oil, palm oil, peanut oil, canola oil, castor oil, and/or sesame seed oil. Such biodiesel fuels may comprise a mixture of esters, such ester typically having 8 to 24, or 12 to 22, or 16 to 18 carbon atoms, with varying degrees of branching and/or percentages of unsaturated groups. Some of such biodiesel fuels are believed to contain the esters of oleic acid ($C_{18}$), linoleic acid ($C_{18}$), linolenic acid ($C_{18}$), and erucic acid ($C_{22}$). Biodiesel fuels derived from vegetable oils are believed to include the esters of the corresponding triglycerides.

Prolonged interaction of the biodiesel fuel with the lubricant in the crankcase can adversely affect the in-service properties of the lubricant, e.g., because the unsaturated esters of the biodiesel fuel can relatively easily be converted into corresponding organic acids under the engine operating conditions. These organic acids are capable of causing a disadvantageous increase in the rate of viscosity change over time and in the rate(s) of formation of sludge, resin, varnish, and/or deposits. At least some of these and other related problems in the state of the art are addressed by disclosed embodiments, e.g., as described herein below and stated in the appended claims.

For example, some embodiments disclosed herein provide methods and compositions that can be used to mitigate at least some of the above-indicated adverse effects caused by the use of biodiesel fuels in internal combustion engines. In particular, applicants have determined that certain combinations of dispersants and antioxidants provide soot and sludge handling properties suitable for meeting or exceeding currently proposed and future lubricant performance standards, while also enabling the corresponding lubricant to maintain satisfactory viscosity characteristics for relatively long periods of time when used in an engine fueled with liquid fuel containing at least about 2 percent by weight of biologically derived fuel.

Although the introduction of a dispersant into a lubricant composition has been known to impart desired soot and sludge handling properties on lubricants used in certain types of engines, lubricant compositions containing non-customized dispersants may not perform as well in engines fueled by liquid fuel that has a biodiesel component therein. In particular, applicants have determined that some conventional lubricant compositions fail some or all oxidation tests carried out in the presence of biodiesel. One example of such an oxidation test is known by its official designation "GFC-Lu-43A-11" in the ACEA 2012 EUROPEAN OIL SEQUENCES FOR SERVICE-FILL OILS, which is incorporated herein by reference in its entirety. Another example of such an oxidation test known by its official designation "CEC L-109" is included into the ACEA 2016 Engine Oil Sequences, which is incorporated herein by reference in its entirety. These and some other relevant oxidation tests measure the lubricant viscosity change, with respect to the baseline kinematic viscosity, after a specified length of time under simulated-use conditions in a test tube or flask. A lubricant is deemed to fail the test, e.g., if the viscosity increase observed at the predetermined time is higher than a fixed predetermined percentage of the baseline kinematic viscosity or if the lubricant partially or fully solidifies.

Embodiments of the present invention provide methods and compositions that can be used to extend the length of time during which the lubricant provides satisfactory soot and sludge handling properties, compared to that of conventional lubricants, in engines fueled with liquid fuel containing a biodiesel component therein. For example, applicants have determined that certain combinations of a dispersant and an antioxidant enable the lubricant to maintain satisfactory viscosity for relatively long periods of time. In particular, in some embodiments, the average molecular weight of the dispersant and/or the dispersant type has an unexpectedly large effect on the observed oxidation stability and kinematic viscosity of the corresponding lubricant. In some embodiments, combinations of two or more dispersants having different respective average molecular weights may produce beneficial effects which may, in some cases, be similar to those observed with a certain single dispersant, but at a reduced cost of the corresponding lubricant composition.

In an example embodiment, the lubricant composition comprises a dispersant composition including a first dispersant component containing at least one dispersant that is a reaction product of A) polyisobutenyl succinic acid or anhydride having a polyisobutenyl group with a number average molecular weight less than or equal to about 1300, and B) at least one polyamine and a second dispersant component that contains at least one dispersant that is a reaction product of A') polyisobutenyl succinic acid or anhydride having a polyisobutenyl group with number average molecular weight that greater than about 1300, and B') at least one polyamine. The ratio of the weight percentage of the second dispersant component to the dispersant composition is from about 0.66:1 to 1:1.

Components A and A'

The hydrocarbyl moiety of the hydrocarbyl-dicarboxylic acid or anhydride of Components A and A' may be derived from butene polymers, for example polymers of isobutylene. Suitable polyisobutenes for use herein include those formed from polyisobutylene or highly reactive polyisobutylene having at least about 60%, such as about 70% to about 90% and above, terminal vinylidene content. Suitable polyisobutenes may include those prepared using $BF_3$ catalysts. The average number molecular weight of the polyalkenyl substituent may vary over a wide range, for example from about 100 to about 5000, such as from about 500 to about 5000, as determined by GPC using polystyrene as a calibration reference as described above.

The dicarboxylic acid or anhydride of Components A and A' may be selected from maleic anhydride or from carboxylic reactants other than maleic anhydride, such as maleic acid, fumaric acid, malic acid, tartaric acid, itaconic acid, itaconic anhydride, citraconic acid, citraconic anhydride, mesaconic acid, ethylmaleic anhydride, dimethylmaleic anhydride, ethylmaleic acid, dimethylmaleic acid, hexylmaleic acid, and the like, including the corresponding acid halides and lower aliphatic esters. A suitable dicarboxylic anhydride is maleic anhydride. A mole ratio of maleic anhydride to hydrocarbyl moiety in a reaction mixture used to make Components A and A' may vary widely. Accordingly, the mole ratio may vary from about 5:1 to about 1:5, for example from about 3:1 to about 1:3, and as a further example, the maleic anhydride may be used in stoichiometric excess to force the reaction to completion. The unreacted maleic anhydride may be removed by vacuum distillation.

Components B and B'

Any of numerous polyamines can be used as Components B and B' in preparing the functionalized dispersant. The polyamine Components B and B' may be a polyalkylene polyamine. Non-limiting examples of polyamines may include ethylene diamine, propane diamine, butane diamine, diethylene triamine (DETA), triethylene tetramine (TETA), pentaethylene hexamine (PEHA)aminoethyl piperazine, tetraethylene pentamine (TEPA), N-methyl-1,3-propane diamine, N,N'-dimethyl-1,3-propane diamine, aminoguanidine bicarbonate (AGBC), and heavy polyamines such as E100 heavy amine bottoms. A heavy polyamine may comprise a mixture of polyalkylenepolyamines having small amounts of lower polyamine oligomers such as TEPA and PEHA, but primarily oligomers having seven or more nitrogen atoms, two or more primary amines per molecule, and more extensive branching than conventional polyamine mixtures. Additional non-limiting examples of polyamines that may be used to prepare the hydrocarbyl-substituted succinimide dispersant are disclosed in U.S. Pat. No. 6,548,458, the disclosure of which is incorporated herein by reference in its entirety. Preferably, the polyamines used as Component B and B' in the reactions to form the first and second dispersants are selected from the group of triethylene tetraamine, tetraethylene pentamine, E100 heavy amine bottoms, and combinations thereof. In one preferred embodiment, the polyamine may be tetraethylene pentamine (TEPA).

In some embodiments, some or all of the first and second dispersants may be derived from compounds of formula (I):

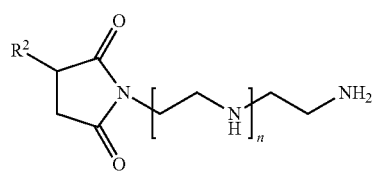

(I)

wherein n represents 0 or an integer of from 1 to 5, and $R^2$ is a hydrocarbyl substituent as defined above. In an example embodiment, n is 3 and $R^2$ is a polyisobutenyl substituent, such as that derived from polyisobutylenes having at least about 60%, such as about 70% to about 90% and above, terminal vinylidene content. Compounds of formula (I) may be the reaction product of a hydrocarbyl-substituted succinic anhydride, such as a polyisobutenyl succinic anhydride (PIBSA), and a polyamine, for example tetraethylene pentamine (TEPA).

The foregoing compound of formula (I) may have a molar ratio of (A) polyisobutenyl-substituted succinic anhydride to (B) polyamine in the range of from 1:1 to 10:1, preferably, 1:1 to 5:1, or 4:3 to 3:1 or 4:3 to 2:1. A particularly useful dispersant contains polyisobutenyl group of the polyisobutenyl-substituted succinic anhydride having a number average molecular weight (Mn) in the range of from about 500 to 5000 as determined by GPC using polystyrene as a calibration reference and a (B) polyamine having a general formula $H_2N(CH_2)m-[NH(CH_2)_m]_n-NH_2$, wherein m is in the range from 2 to 4 and n is in the range of from 1 to 2. Preferably, A or A' is polyisobutylene succinic anhydride (PIBSA). The PIBSA or A and A' may have an average of between about 1.0 and about 2.0 succinic acid moieties per polymer.

Examples of N-substituted long chain alkenyl succinimides of the Formula (I) include polyisobutylene succinimide with number average molecular weight of the polyisobutylene substituent in the range about 350 to about 50,000, or to about 5,000, or to about 3,000. Succinimide dispersants and their preparation are disclosed, for instance in U.S. Pat. No. 7,897,696 or 4,234,435. The polyolefin may be prepared from polymerizable monomers containing about 2 to about 16, or about 2 to about 8, or about 2 to about 6 carbon atoms.

In an example embodiment, any or some of the first and second dispersants can be derived from polyisobutylene (PIB) with a number average molecular weight in the range from about 350 to about 50,000, or to about 5000, or to about 3000. In some embodiments, polyisobutylene, when included, may have greater than 50 mol %, greater than 60 mol %, greater than 70 mol %, greater than 80 mol %, or greater than 90 mol % content of terminal double bonds. Such PIB is also referred to as highly reactive PIB ("HR-PIB"). HR-PIB having a number average molecular weight ranging from about 800 to about 5000 is suitable for use in embodiments of the present disclosure. Conventional PIB typically has less than 50 mol %, less than 40 mol %, less than 30 mol %, less than 20 mol %, or less than 10 mol % content of terminal double bonds. The % actives of the alkenyl or alkyl succinic anhydride can be determined using a chromatographic technique. This method is described in column 5 and 6 in U.S. Pat. No. 5,334,321.

Conversion of hydrocarbyl succinic acid or anhydride to a succinimide is well known in the art and may be accomplished through the reaction of a polyamine with the hydrocarbyl succinic acid or anhydride, wherein the polyamine has at least one basic nitrogen in the compound, as described in U.S. Pat. Nos. 3,215,707 and 4,234,435. Suitable polyamines may have at least three nitrogen atoms and about 4 to 20 carbon atoms. One or more oxygen atoms may also be present in the polyamine.

A particularly suitable group of polyamines for use in the present disclosure are polyalkylene polyamines, including alkylene diamines. Such polyalkylene polyamines may contain from about 2 to about 12 nitrogen atoms and from about 2 to about 24 carbon atoms. Preferably, the alkylene groups of such polyalkylene polyamines may contain from about 2 to about 6 carbon atoms, more preferably from about 2 to about 4 carbon atoms.

Examples of suitable polyalkylene polyamines include, but are not limited to, ethylenediamine, propylenediamine, isopropylenediamine, butylenediamine, pentylenediamine, hexylenediamine, diethylenetriamine, dipropylenetriamine, dimethylaminopropylamine, diisopropylenetriamine, dibutylenetriamine, di-sec-butylenetriamine, triethylenetetraamine, tripropylenetetraamine, triisobutylenetetraamine, tetraethylenepentamine, pentaethylenehexamine, dimethylaminopropylamine, and mixtures thereof.

The reaction of polyamine and hydrocarbyl succinic acid or anhydride affords mono-succinimide, bis-succinimide, tris-succinimide, or other succinimides depending on the charge ratio of polyamine and succinic acid or anhydride. In some embodiment, the ratio between hydrocarbyl succinic acid/anhydride and polyamine is 1:1 to 3.2:1, or 2.5:1 to 3:1, or 2.9:1 to 3:1, or 1.6:1 to 2.5:1, or 1.6:1 to 2:1, or 1.6:1 to 1.8:1, 1.3:1 to 1.6:1, 1.4:1 to 1.6:1, or 1:1 to 1.3:1, or 1.2:1 to 1.3:1.

Many of the polyamines suitable for use in the present disclosure are commercially available and others may be prepared by methods which are well known in the art. For example, methods for preparing amines and their reactions are detailed in Sidgewick's "The Organic Chemistry of Nitrogen," Clarendon Press, Oxford, 1966; Noller's "Chemistry of Organic Compounds," Saunders, Philadelphia, 2nd Ed., 1957; and Kirk-Othmer's "Encyclopedia of Chemical Technology," 2nd Ed., especially Volume 2, pp. 99-116.

An HR-PIB having a number average molecular weight ranging from about 900 to about 3000 may be suitable for use in embodiments disclosed herein. Such an HR-PIB is commercially available, or can be synthesized by the polymerization of isobutene in the presence of a non-chlorinated catalyst such as boron trifluoride, as described in U.S. Pat. No. 4,152,499 to Boerzel, et al. and U.S. Pat. No. 5,739,355 to Gateau, et al. When used in the aforementioned thermal ene reaction, HR-PIB may lead to higher conversion rates in the reaction, as well as lower amounts of sediment formation, due to increased reactivity. A suitable method is described in U.S. Pat. No. 7,897,696.

The dispersants may be post-treated using any one or more of the post-treatment methods discussed below in relation to the additional dispersants that may be included in the compositions of the invention. The post-treatment step may be carried out upon completion of the reaction of the olefin copolymer with succinic anhydride, and at least one polyamine.

The TBN of a suitable dispersant may be from about 10 to about 65 on an oil-free basis, which is comparable to about 5 to about 30 TBN if measured on a dispersant sample containing about 50% diluent oil.

The dispersant composition is present in the lubricant composition in a sufficient amount to provide a nitrogen content of at least about 0.06 percent by weight, based on the total weight of the lubricant composition. In the above example embodiment, both the first dispersant component and the second dispersant component contribute nitrogen content to the lubricating composition. Preferably, the ratio of the weight percentage of nitrogen contributed by the second dispersant component to the total weight percentage of the nitrogen provided by the dispersant composition is from about 0.62:1 to 1:1. Further, the ratio of the number average molecular weight of the second dispersant component to the number average molecular weight of the dispersant composition is from about 0.72:1 to 1:1.

The foregoing lubricant composition that employs a combination of dispersants shows a beneficial effect in combination with ashless antioxidants. In some embodiments, the antioxidants may be substantially free of copper. Specifically, a combination of an aminic antioxidant and a phenolic antioxidant can be used in the lubricating composition. In a preferred embodiment, the ratio of the phenolic antioxidant to the aminic antioxidant is from 0.3:0.8 to 0.7:0.8 or about 0.5:0.8.

Suitable antioxidants that can be used as the phenolic antioxidant preferably can include hindered phenol antioxidants. Hindered phenol antioxidants may contain a secondary butyl and/or a tertiary butyl group as a sterically hindering group. The phenol group may be further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox™ L-135 available from BASF or an addition product derived from 2,6-di-tert-butylphenol and an alkyl acrylate, wherein the alkyl group may contain about 1 to about 18, or about 2 to about 12, or about 2 to about 8, or about 2 to about 6, or about 4 carbon atoms. Another commercially available hindered phenol antioxidant may be an ester and may include Ethanox™ 4716 available from Albemarle Corporation.

Aminic antioxidants may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Suitable aminic antioxidants preferably can include alkylated diphenylamines (e.g., nonyl diphenylamine, di-nonyl diphenylamine, octyl diphenylamine, di-octyl diphenylamine). An exemplary aminic antioxidant is nonylated diphenylamine (Naugalube® 438L).

In another alternative embodiment the antioxidant composition also contains a molybdenum-containing antioxidant in addition to the phenolic and aminic antioxidants discussed above. When a combination of these three antioxidants is used, preferably the weight ratio of phenolic antioxidant to aminic antioxidant to molybdenum-containing antioxidant is 0-2:0-2:0-1, where at least one of the amounts is not zero. In a more preferred embodiment, the weight ratio of phenolic antioxidant to aminic antioxidant to molybdenum-containing antioxidant is 0.5-1.5:0.25-1:0.05-0.2. In a particularly preferred embodiment, the weight ratio of phenolic antioxidant to aminic antioxidant to molybdenum-containing antioxidant is 1:0.5:0.1.

Suitable molybdenum-containing antioxidants include, oil-soluble molybdenum-containing compounds and are exemplified as follows.

I. Sulfur- and Phosphorus-Free Organomolybdenum Compounds

Sulfur- and phosphorus-free organomolybdenum compounds may be prepared by reacting a sulfur and phosphorus-free molybdenum source with an organic compound containing amino and/or alcohol groups. Examples of sulfur- and phosphorus-free molybdenum sources include molybdenum trioxide, ammonium molybdate, sodium molybdate and potassium molybdate. The amino groups may be monoamines, diamines, or polyamines. The alcohol groups may be mono-substituted alcohols, diols or bis-alcohols, or polyalcohols. As an example, the reaction of diamines with fatty oils produces a product containing both amino and alcohol groups that can react with the sulfur- and phosphorus-free molybdenum source.

Examples of sulfur- and phosphorus-free organomolybdenum compounds appearing in patents and patent applications which are fully incorporated herein by reference include the following:
1. Compounds prepared by reacting certain basic nitrogen compounds with a molybdenum source as defined in U.S. Pat. Nos. 4,259,195 and 4,261,843.
2. Compounds prepared by reacting a hydrocarbyl substituted hydroxy alkylated amine with a molybdenum source as defined in U.S. Pat. No. 4,164,473.
3. Compounds prepared by reacting a phenol aldehyde condensation product, a mono-alkylated alkylene diamine, and a molybdenum source as defined in U.S. Pat. No. 4,266,945.
4. Compounds prepared by reacting a fatty oil, diethanolamine, and a molybdenum source as defined in U.S. Pat. No. 4,889,647.
5. Compounds prepared by reacting a fatty oil or acid with 2-(2-aminoethyl)aminoethanol, and a molybdenum source as defined in U.S. Pat. No. 5,137,647.
6. Compounds prepared by reacting a secondary amine with a molybdenum source as defined in U.S. Pat. No. 4,692,256.
7. Compounds prepared by reacting a diol, diamino, or amino-alcohol compound with a molybdenum source as defined in U.S. Pat. No. 5,412,130.
8. Compounds prepared by reacting a fatty oil, mono-alkylated alkylene diamine, and a molybdenum source as defined in European Patent Application EP 1 136 496 A1.
9. Compounds prepared by reacting a fatty acid, mono-alkylated alkylene diamine, glycerides, and a molybdenum source as defined in European Patent Application EP 1 136 497 A1.

Examples of commercial sulfur- and phosphorus-free oil soluble molybdenum compounds are Sakura-Lube 700 from Asahi Denka Kogyo K. K., and Molyvan® 856B and Molyvan® 855 from R. T. Vanderbilt Company, Inc.

Molybdenum compounds prepared by reacting a fatty oil, diethanolamine, and a molybdenum source as defined in U.S. Pat. No. 4,889,647 are sometimes illustrated with the following structure, where R is a fatty alkyl chain, although the exact chemical composition of these materials is not fully known and may in fact be multi-component mixtures of several organomolybdenum compounds.

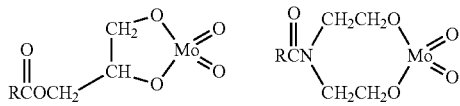

II. Sulfur-Containing Organomolybdenum Compounds

The sulfur-containing organomolybdenum compounds may be prepared by a variety of methods. One method involves reacting a sulfur and phosphorus-free molybdenum source with an amino group and one or more sulfur sources. Sulfur sources can include for example, but are not limited to, carbon disulfide, hydrogen sulfide, sodium sulfide and elemental sulfur. Alternatively, the sulfur-containing molybdenum compound may be prepared by reacting a sulfur-containing molybdenum source with an amino group or thiuram group and optionally a second sulfur source. Examples of sulfur- and phosphorus-free molybdenum sources include molybdenum trioxide, ammonium molybdate, sodium molybdate, potassium molybdate and molybdenum halides. The amino groups may be monoamines, diamines, or polyamines. As an example, the reaction of molybdenum trioxide with a secondary amine and carbon disulfide produces molybdenum dithiocarbamates. Alternatively, the reaction of $(NH_4)_2Mo_3S_{13}*n(H_2O)$ where n varies between 0 to 2, with a tetralkylthiuram disulfide, produces a trinuclear sulfur-containing molybdenum dithiocarbamate.

Examples of sulfur-containing organomolybdenum compounds appearing in patents and patent applications include the following:
1. Compounds prepared by reacting molybdenum trioxide with a secondary amine and carbon disulfide as defined in U.S. Pat. Nos. 3,509,051 and 3,356,702.
2. Compounds prepared by reacting a sulfur-free molybdenum source with a secondary amine, carbon disulfide, and an additional sulfur source as defined in U.S. Pat. No. 4,098,705.
3. Compounds prepared by reacting a molybdenum halide with a secondary amine and carbon disulfide as defined in U.S. Pat. No. 4,178,258.
4. Compounds prepared by reacting a molybdenum source with a basic nitrogen compound and a sulfur source as defined in U.S. Pat. Nos. 4,263,152, 4,265,773, 4,272,387, 4,285,822, 4,369,119, 4,395,343.
5. Compounds prepared by reacting ammonium tetrathiomolybdate with a basic nitrogen compound as defined in U.S. Pat. No. 4,283,295.
6. Compounds prepared by reacting an olefin, sulfur, an amine and a molybdenum source as defined in U.S. Pat. No. 4,362,633.
7. Compounds prepared by reacting ammonium tetrathiomolybdate with a basic nitrogen compound and an organic sulfur source as defined in U.S. Pat. No. 4,402,840.
8. Compounds prepared by reacting a phenolic compound, an amine and a molybdenum source with a sulfur source as defined in U.S. Pat. No. 4,466,901.
9. Compounds prepared by reacting a triglyceride, a basic nitrogen compound, a molybdenum source, and a sulfur source as defined in U.S. Pat. No. 4,765,918.
10. Compounds prepared by reacting alkali metal alkylthioxanthate salts with molybdenum halides as defined in U.S. Pat. No. 4,966,719.
11. Compounds prepared by reacting a tetralkylthiuram disulfide with molybdenum hexacarbonyl as defined in U.S. Pat. No. 4,978,464.
12. Compounds prepared by reacting an alkyl dixanthogen with molybdenum hexacarbonyl as defined in U.S. Pat. No. 4,990,271.
13. Compounds prepared by reacting alkali metal alkylxanthate salts with dimolybdenum tetra-acetate as defined in U.S. Pat. No. 4,995,996.
14. Compounds prepared by reacting $(NH_4)_2Mo_3S_{13}*2H_2O$ with an alkali metal dialkyldithiocarbamate or tetralkyl thiuram disulfide as define in U.S. Pat. No. 6,232,276.
15. Compounds prepared by reacting an ester or acid with a diamine, a molybdenum source and carbon disulfide as defined in U.S. Pat. No. 6,103,674.
16. Compounds prepared by reacting an alkali metal dialkyldithiocarbamate with 3-chloropropionic acid, followed by molybdenum trioxide, as defined in U.S. Pat. No. 6,117,826.

Examples of commercial oil soluble molybdenum compounds are Sakura-Lube 100, Sakura-Lube 155, Sakura-Lube 165, Sakura-Lube 200, Sakura-Lube 300, Sakura-Lube 310G, Sakura-Lube 525, Sakura-Lube 600, Sakura-Lube 700, Sakura-Lube 710, and Sakura-Lube 180 from Asahi Denka Kogyo K. K., Molyvan® A, Molyvan® L, Molyvan® 807, Molyvan® 2000, Molyvan® 3000, and Molyvan® 822 from R. T. Vanderbilt Company, and Naugalube MolyFM from Crompton Corporation.

When the three antioxidants are used in combination within the antioxidant composition, the ratios of the second dispersant component to the total dispersant composition can be reduced. In this alternative embodiment, the lubricant composition comprises a dispersant composition including a first dispersant component containing at least one dispersant that is a reaction product of A) polyisobutenyl succinic acid or anhydride having a polyisobutenyl group with a number average molecular weight less than or equal to about 1300, and B) at least one polyamine and a second dispersant component that contains at least one dispersant that is a reaction product of A') polyisobutenyl succinic acid or anhydride having a polyisobutenyl group with number average molecular weight that greater than about 1300, and B') at least one polyamine. The ratio of the weight percentage of second dispersant component to the dispersant composition is from about 0.42:1 to 1:1.

In the above example embodiments having the molybdenum-containing antioxidant, both the first dispersant component and the second dispersant component contribute nitrogen content to the lubricating composition. Preferably, the ratio of the weight percentage of nitrogen contributed by the second dispersant component to the total weight percentage of the nitrogen provided by the dispersant composition is from about 0.40:1 to 1:1. Further, the ratio of the number average molecular weight of the second dispersant component to the number average molecular weight of the dispersant composition is from about 0.51:1 to 1:1.

In some embodiments, the lubricant composition contains at least about 0.05 or at least about 1.0 or at least about 3.0 percent by weight, based on the total weight of the lubricant composition, of the fatty acid alkyl ester arising from dilution caused by the operation of an engine fueled with liquid fuel containing the fatty acid alkyl ester.

In addition to the foregoing dispersant combinations, the lubricant composition contains a base oil, and may include other conventional ingredients, including but not limited to, friction modifiers, additional dispersants, metal detergents, antiwear agents, antifoam agents, additional antioxidants, viscosity modifiers, pour point depressants, corrosion inhibitors and the like.

Base Oil

The base oil used in the lubricating oil compositions herein may be selected from any of the base oils in Groups as specified in the American Petroleum Institute (API) Base Oil Interchangeability Guidelines. The five base oil groups are as follows:

| Base oil Category | Sulfur (%) | | Saturates (%) | Viscosity Index |
|---|---|---|---|---|
| Group I | >0.03 | and/or | <90 | 80 to 120 |
| Group II | ≤0.03 | And | ≥90 | 80 to 120 |
| Group III | ≤0.03 | And | ≥90 | ≥120 |
| Group IV | All polyalphaolefins (PAOs) | | | |
| Group V | All others not included in Groups I, II, III, or IV | | | |

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that when Group III base oils are derived from mineral oil, the rigorous processing that these fluids undergo causes their physical properties to be very similar to some true synthetics, such as PAOs. Therefore, oils derived from Group III base oils may be referred to as synthetic fluids in the industry.

The base oil used in the disclosed lubricating oil composition may be a mineral oil, animal oil, vegetable oil, synthetic oil, or mixtures thereof. Suitable oils may be derived from hydrocracking, hydrogenation, hydrofinishing, unrefined, refined, and re-refined oils, and mixtures thereof.

Unrefined oils are those derived from a natural, mineral, or synthetic source without or with little further purification treatment. Refined oils are similar to the unrefined oils except that they have been treated in one or more purification steps, which may result in the improvement of one or more properties. Examples of suitable purification techniques are solvent extraction, secondary distillation, acid or base extraction, filtration, percolation, and the like. Oils refined to the quality of an edible may or may not be useful. Edible oils may also be called white oils. In some embodiments, lubricating oil compositions are free of edible or white oils.

Re-refined oils are also known as reclaimed or reprocessed oils. These oils are obtained similarly to refined oils using the same or similar processes. Often these oils are additionally processed by techniques directed to removal of spent additives and oil breakdown products.

Mineral oils may include oils obtained by drilling or from plants and animals or any mixtures thereof. For example such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as α-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof. Polyalphaolefins are typically hydrogenated materials.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

The major amount of base oil included in a lubricating composition may be selected from the group consisting of Group I, Group II, a Group III, a Group IV, a Group V, and a combination of two or more of the foregoing, and wherein the major amount of base oil is other than base oils that arise from provision of additive components or viscosity index improvers in the composition. In another embodiment, the major amount of base oil included in a lubricating composition may be selected from the group consisting of Group II having at least 90% saturates, a Group III having at least 90% saturates, a Group IV, a Group V, and a combination of two or more of the foregoing, and wherein the major amount of base oil is other than base oils that arise from provision of additive components or viscosity index improvers in the composition.

The amount of the oil of lubricating viscosity present may be the balance remaining after subtracting from 100 wt. % the sum of the amount of the performance additives inclusive of viscosity index improver(s) and/or pour point depressant(s) and/or other top treat additives. For example, the oil of lubricating viscosity that may be present in a finished fluid may be a major amount, such as greater than about 50 wt. %, greater than about 60 wt. %, greater than about 70 wt. %, greater than about 80 wt. %, greater than about 85 wt. %, or greater than about 90 wt. %.

Antioxidants

The lubricating oil compositions herein also may optionally contain one or more additional antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Preferably, the antioxidants are ashless (metal-free) or substantially free of copper. Antioxidant compounds may be used alone or in combination.

Useful antioxidants may include diarylamines and high molecular weight phenols. In an embodiment, the lubricating oil composition may contain a mixture of a diarylamine and a high molecular weight phenol, such that each antioxidant may be present in an amount sufficient to provide up to about 5%, by weight, based upon the final weight of the lubricating oil composition. In an embodiment, the antioxidant may be a mixture of about 0.3 to about 1.5% diarylamine and about 0.4 to about 2.5% high molecular weight phenol, by weight, based upon the final weight of the lubricating oil composition.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In one embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as α-olefins.

The one or more additional antioxidant(s) may be present in ranges about 0 wt. % to about 20 wt. %, or about 0.1 wt. % to about 10 wt. %, or about 1 wt. % to about 5 wt. %, of the lubricating oil composition.

In an alternative embodiment, wherein lubricant composition has a weight ratio of the second dispersant to the dispersant composition of about 0.66:1 to 1:1, the antioxidant is ashless and may be selected from at least one of a sulfurized antioxidant, a phenolic antioxidant, and an aminic antioxidant. Preferably, the antioxidant comprises a phenolic antioxidant and an aminic antioxidant in a ratio of about 0.3:0.8 to about 0.7:0.8 or approximately 0.5:0.8. In the foregoing embodiment, the antioxidant may be substantially free of copper. In the alternative embodiment, the lubricant composition may also further include a molybdenum-containing compound.

In an alternative embodiment, wherein the lubricant composition has a weight ratio of the second dispersant to the dispersant composition of about 0.42:1 to 1:1, the antioxidant is substantially free of copper and optionally comprises a phenolic antioxidant, an aminic antioxidant, and a molybdenum-containing antioxidant in a ratio of approximately 0.5:1.0:0.1.

Antiwear Agents

The lubricating oil compositions herein also may optionally contain one or more antiwear agents. Examples of suitable antiwear agents include, but are not limited to, a metal thiophosphate; a metal dialkyldithiophosphate; a phosphoric acid ester or salt thereof; a phosphate ester(s); a phosphite; a phosphorus-containing carboxylic ester, ether, or amide; a sulfurized olefin; thiocarbamate-containing compounds including, thiocarbamate esters, alkylene-coupled thiocarbamates, and bis(S-alkyldithiocarbamyl)disulfides; and mixtures thereof. A suitable antiwear agent may be a molybdenum dithiocarbamate. The phosphorus containing antiwear agents are more fully described in European Patent 612 839. The metal in the dialkyl dithio phosphate salts may be an alkali metal, alkaline earth metal, aluminum, lead, tin, molybdenum, manganese, nickel, copper, titanium, or zinc. A useful antiwear agent may be zinc dialkylthiophosphate.

Further examples of suitable antiwear agents include titanium compounds, tartrates, tartrimides, oil soluble amine salts of phosphorus compounds, sulfurized olefins, phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl) disulfides. The tartrate or tartrimide may contain alkyl-ester groups, where the sum of carbon atoms on the alkyl groups may be at least 8. The antiwear agent may in one embodiment include a citrate.

The antiwear agent may be present in ranges including about 0 wt. % to about 15 wt. %, or about 0.01 wt. % to about 10 wt. %, or about 0.05 wt. % to about 5 wt. %, or about 0.1 wt. % to about 3 wt. % of the lubricating oil composition.

Boron-Containing Compounds

The lubricating oil compositions herein may optionally contain one or more boron-containing compounds.

Examples of boron-containing compounds include borate esters, borated fatty amines, borated epoxides, borated detergents, and borated dispersants, such as borated succinimide dispersants, as disclosed in U.S. Pat. No. 5,883,057.

The boron-containing compound, if present, can be used in an amount sufficient to provide up to about 8 wt. %, about 0.01 wt. % to about 7 wt. %, about 0.05 wt. % to about 5 wt. %, or about 0.1 wt. % to about 3 wt. % of the lubricating oil composition.

Detergents

The lubricating oil composition may optionally further comprise one or more neutral, low based, or overbased detergents, and mixtures thereof. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds, or methylene bridged phenols. Suitable detergents and their methods of preparation are described in greater detail in numerous patent publications, including U.S. Pat. No. 7,732,390 and references cited therein. The detergent substrate may be salted with an alkali or alkaline earth metal such as, but not limited to, calcium, magnesium, potassium, sodium, lithium, barium, or mixtures thereof. In some embodiments, the detergent is free of barium. A suitable detergent may include alkali or alkaline earth metal salts of petroleum sulfonic acids and long chain mono- or di-alkylarylsulfonic acids with the aryl group being benzyl, tolyl, and xylyl. Examples of suitable detergents include, but are not limited to, calcium phenates, calcium sulfur containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, calcium methylene bridged phenols, magnesium phenates, magnesium sulfur containing phenates, magnesium sulfonates, magnesium calixarates, magnesium salixarates, magnesium salicylates, magnesium carboxylic acids, magnesium phosphorus acids, magnesium mono- and/or di-thiophosphoric acids, magnesium alkyl phenols, magnesium sulfur coupled alkyl phenol compounds, magnesium methylene bridged phenols, sodium phenates, sodium sulfur containing phenates, sodium sulfonates, sodium calixarates, sodium salixarates, sodium salicylates, sodium carboxylic acids, sodium phosphorus acids, sodium mono- and/or di-thiophosphoric acids, sodium alkyl phenols, sodium sulfur coupled alkyl phenol compounds, or sodium methylene bridged phenols.

Overbased detergent additives are well known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol.

The terminology "overbased" relates to metal salts, such as metal salts of sulfonates, carboxylates, and phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, or phenols.

An overbased detergent of the lubricating oil composition may have a total base number (TBN) of about 200 mg KOH/gram or greater, or as further examples, about 250 mg KOH/gram or greater, or about 350 mg KOH/gram or greater, or about 375 mg KOH/gram or greater, or about 400 mg KOH/gram or greater.

Examples of suitable overbased detergents include, but are not limited to, overbased calcium phenates, overbased calcium sulfur containing phenates, overbased calcium sulfonates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, overbased calcium methylene bridged phenols, overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols.

The overbased detergent may have a metal to substrate ratio of from 1.1:1, or from 2:1, or from 4:1, or from 5:1, or from 7:1, or from 10:1.

In some embodiments, a detergent is effective at reducing or preventing rust in an engine.

The detergent may be present at about 0 wt. % to about 10 wt. %, or about 0.1 wt. % to about 8 wt. %, or about 1 wt. % to about 4 wt. %, or greater than about 4 wt. % to about 8 wt. %.

Additional Dispersants

The lubricating oil composition may optionally further comprise one or more additional dispersants or mixtures thereof. Typical ashless dispersants include N-substituted long chain alkenyl succinimides. Examples of N-substituted long chain alkenyl succinimides include polyisobutylene succinimide with number average molecular weight of the polyisobutylene substituent in the range about 350 to about 50,000, or to about 5,000, or to about 3,000. Succinimide dispersants and their preparation are disclosed, for instance in U.S. Pat. No. 7,897,696 or 4,234,435. The polyolefin may be prepared from polymerizable monomers containing about 2 to about 16, or about 2 to about 8, or about 2 to about 6 carbon atoms. Succinimide dispersants are typically the imide formed from a polyamine, typically a poly(ethyleneamine).

In one embodiment, the additional dispersant may be derived from a polyalphaolefin (PAO) succinic anhydride.

In one embodiment, the additional dispersant may be derived from olefin maleic anhydride copolymer. As an example, the dispersant may be described as a poly-PIBSA.

One class of suitable additional dispersants may be Mannich bases. Mannich bases are materials that are formed by the condensation of a higher molecular weight, alkyl substituted phenol, a polyalkylene polyamine, and an aldehyde such as formaldehyde. Mannich bases are described in more detail in U.S. Pat. No. 3,634,515.

Another suitable class of additional dispersants may be high molecular weight esters or half ester amides.

A suitable additional dispersant may also be post-treated by conventional methods by a reaction with any of a variety of agents. Among these are boron, urea, thiourea, dimercaptothiadiazoles, carbon disulfide, aldehydes, ketones, carboxylic acids, hydrocarbon-substituted succinic anhydrides, maleic anhydride, nitriles, epoxides, carbonates, cyclic carbonates, hindered phenolic esters, and phosphorus compounds. U.S. Pat. Nos. 7,645,726; 7,214,649; and 8,048,831 are incorporated herein by reference in their entireties.

In addition to the carbonate and boric acids post-treatments both the compounds may be post-treated, or further post-treatment, with a variety of post-treatments designed to improve or impart different properties. Such post-treatments include those summarized in columns 27-29 of U.S. Pat. No. 5,241,003, hereby incorporated by reference. Such treatments include, treatment with:

Inorganic phosphorous acids or anhydrates (e.g.; U.S. Pat. Nos. 3,403,102 and 4,648,980);
Organic phosphorous compounds (e.g., U.S. Pat. No. 3,502,677);
Phosphorous pentasulfides;
Boron compounds as already noted above (e.g., U.S. Pat. Nos. 3,178,663 and 4,652,387);
Carboxylic acid, polycarboxylic acids, anhydrides and/or acid halides (e.g., U.S. Pat. Nos. 3,708,522 and 4,948,386);
Epoxides polyepoxiates or thioexpoxides (e.g., U.S. Pat. Nos. 3,859,318 and 5,026,495);
Aldehyde or ketone (e.g., U.S. Pat. No. 3,458,530);
Carbon disulfide (e.g., U.S. Pat. No. 3,256,185);
Glycidol (e.g., U.S. Pat. No. 4,617,137);
Urea, thourea or guanidine (e.g., U.S. Pat. Nos. 3,312,619; 3,865,813; and British Patent GB 1,065,595);
Organic sulfonic acid (e.g., U.S. Pat. No. 3,189,544 and British Patent GB 2,140,811);
Alkenyl cyanide (e.g., U.S. Pat. Nos. 3,278,550 and 3,366,569);
Diketene (e.g., U.S. Pat. No. 3,546,243);
A diisocyanate (e.g., U.S. Pat. No. 3,573,205);
Alkane sultone (e.g., U.S. Pat. No. 3,749,695);
1,3-Dicarbonyl Compound (e.g., U.S. Pat. No. 4,579,675);
Sulfate of alkoxylated alcohol or phenol (e.g., U.S. Pat. No. 3,954,639);
Cyclic lactone (e.g., U.S. Pat. Nos. 4,617,138; 4,645,515; 4,668,246; 4,963,275; and 4,971,711);
Cyclic carbonate or thiocarbonate linear monocarbonate or polycarbonate, or chloroformate (e.g., U.S. Pat. Nos. 4,612,132; 4,647,390; 4,648,886; 4,670,170);
Nitrogen-containing carboxylic acid (e.g., U.S. Pat. No. 4,971,598 and British Patent GB 2,140,811);
Hydroxy-protected chlorodicarbonyloxy compound (e.g., U.S. Pat. No. 4,614,522);
Lactam, thiolactam, thiolactone or ditholactone (e.g., U.S. Pat. Nos. 4,614,603 and 4,666,460);
Cyclic carbonate or thiocarbonate, linear monocarbonate or plycarbonate, or chloroformate (e.g., U.S. Pat. Nos. 4,612,132; 4,647,390; 4,646,860; and 4,670,170);
Nitrogen-containing carboxylic acid (e.g., U.S. Pat. No. 4,971,598 and British Patent GB 2,440,811);
Hydroxy-protected chlorodicarbonyloxy compound (e.g., U.S. Pat. No. 4,614,522);
Lactam, thiolactam, thiolactone or ditholactone (e.g., U.S. Pat. Nos. 4,614,603, and 4,666,460);
Cyclic carbamate, cyclic thiocarbamate or cyclic dithiocarbamate (e.g., U.S. Pat. Nos. 4,663,062 and 4,666,459);
Hydroxyaliphatic carboxylic acid (e.g., U.S. Pat. Nos. 4,482,464; 4,521,318; 4,713,189);
Oxidizing agent (e.g., U.S. Pat. No. 4,379,064);
Combination of phosphorus pentasulfide and a polyalkylene polyamine (e.g., U.S. Pat. No. 3,185,647);
Combination of carboxylic acid or an aldehyde or ketone and sulfur or sulfur chloride (e.g., U.S. Pat. Nos. 3,390,086; 3,470,098);
Combination of a hydrazine and carbon disulfide (e.g. U.S. Pat. No. 3,519,564);
Combination of an aldehyde and a phenol (e.g., U.S. Pat. Nos. 3,649,229; 5,030,249; 5,039,307);
Combination of an aldehyde and an O-diester of dithiophosphoric acid (e.g., U.S. Pat. No. 3,865,740);
Combination of a hydroxyaliphatic carboxylic acid and a boric acid (e.g., U.S. Pat. No. 4,554,086);
Combination of a hydroxyaliphatic carboxylic acid, then formaldehyde and a phenol (e.g., U.S. Pat. No. 4,636,322);
Combination of a hydroxyaliphatic carboxylic acid and then an aliphatic dicarboxylic acid (e.g., U.S. Pat. No. 4,663,064);
Combination of formaldehyde and a phenol and then glycolic acid (e.g., U.S. Pat. No. 4,699,724);
Combination of a hydroxyaliphatic carboxylic acid or oxalic acid and then a diisocyanate (e.g. U.S. Pat. No. 4,713,191);
Combination of inorganic acid or anhydride of phosphorus or a partial or total sulfur analog thereof and a boron compound (e.g., U.S. Pat. No. 4,857,214);
Combination of an organic diacid then an unsaturated fatty acid and then a nitrosoaromatic amine optionally followed by a boron compound and then a glycolating agent (e.g., U.S. Pat. No. 4,973,412);
Combination of an aldehyde and a triazole (e.g., U.S. Pat. No. 4,963,278);
Combination of an aldehyde and a triazole then a boron compound (e.g., U.S. Pat. No. 4,981,492);
Combination of cyclic lactone and a boron compound (e.g., U.S. Pat. Nos. 4,963,275 and 4,971,711). The above mentioned patents are herein incorporated in their entireties.

Any additional dispersant, if present, can be used in an amount sufficient to provide up to about 20 wt. %, based upon the final weight of the lubricating oil composition. Another amount of the dispersant that can be used may be about 0.1 wt. % to about 15 wt. %, or about 0.1 wt. % to about 10 wt. %, or about 3 wt. % to about 10 wt. %, or about 1 wt. % to about 6 wt. %, or about 7 wt. % to about 12 wt. %, based upon the final weight of the lubricating oil composition. In some embodiments, the lubricating oil composition utilizes a mixed dispersant system. A single type or a mixture of two or more types of dispersants may be used in accordance with the percentages of the specified dispersants discussed above with respect to the total amount of dispersant in the lubricating oil composition.

Friction Modifiers

The lubricating oil compositions herein also may optionally contain one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanadine, alkanolamides, phosphonates, metal-containing compounds, glycerol esters, sulfurized fatty compounds and olefins, sunflower oil other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In some embodiments the friction modifier may be a long chain fatty acid ester. In another embodiment the long chain fatty acid ester may be a mono-ester, or a di-ester, or a (tri)glyceride. The friction modifier may be a long chain fatty amide, a long chain fatty ester, a long chain fatty epoxide derivatives, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685, herein incorporated by reference in its entirety.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference in its entirety.

A friction modifier may optionally be present in ranges such as about 0 wt. % to about 10 wt. %, or about 0.01 wt. % to about 8 wt. %, or about 0.1 wt. % to about 4 wt. %.

Molybdenum-Containing Component

The lubricating oil compositions herein also may optionally contain one or more molybdenum-containing compounds. An oil-soluble molybdenum compound may have the functional performance of an antiwear agent, an antioxidant, a friction modifier, or mixtures thereof. An oil-soluble molybdenum compound may include molybdenum dithiocarbamates, molybdenum dialkyldithiophosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclear organo-molybdenum compound, and/or mixtures thereof. The molybdenum sulfides include molybdenum disulfide. The molybdenum disulfide may be in the form of a stable dispersion. In one embodiment the oil-soluble molybdenum compound may be selected from the group consisting of molybdenum dithiocarbamates, molybdenum dialkyldithiophosphates, amine salts of molybdenum compounds, and mixtures thereof. In one embodiment the oil-soluble molybdenum compound may be a molybdenum dithiocarbamate.

Suitable examples of commercial oil soluble molybdenum compounds are Sakura-Lube 100, Sakura-Lube 155, Sakura-Lube 165, Sakura-Lube 200, Sakura-Lube 300, Sakura-Lube 310G, Sakura-Lube 525, Sakura-Lube 600, Sakura-Lube 700, Sakura-Lube 710, and Sakura-Lube 180 from Asahi Denka Kogyo K. K., Molyvan® A, Molyvan® L, Molyvan® 807, Molyvan® 2000, Molyvan® 3000, and Molyvan® 822 from R. T. Vanderbilt Company, and Naugalube MolyFM from Crompton Corporation. Suitable molybdenum components are also described in U.S. Pat. No. 5,650,381; US RE 37,363 E1; US RE 38,929 E1; and US RE 40,595 E1, incorporated herein by reference in their entireties.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl6$, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285, 822; 4,283,295; 4,272,387; 4,265,773; 4,261,843; 4,259,195 and 4,259,194; and WO 94/06897, incorporated herein by reference in their entireties.

Another class of suitable organo-molybdenum compounds are trinuclear molybdenum compounds, such as those of the formula $Mo_3S_kL_nQ_z$ and mixtures thereof, wherein S represents sulfur, L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water; amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference in its entirety.

The oil-soluble molybdenum compound may be present in an amount sufficient to provide about 0.5 ppm to about 2000 ppm, about 1 ppm to about 700 ppm, about 1 ppm to about 550 ppm, about 5 ppm to about 300 ppm, or about 20 ppm to about 250 ppm of molybdenum.

Transition Metal-Containing Compounds

In another embodiment, the oil-soluble compound may be a transition metal containing compound or a metalloid. The transition metals may include, but are not limited to, titanium, vanadium, copper, zinc, zirconium, molybdenum, tantalum, tungsten, and the like. Suitable metalloids include, but are not limited to, boron, silicon, antimony, tellurium, and the like.

In an embodiment, an oil-soluble transition metal-containing compound may function as antiwear agents, friction modifiers, antioxidants, deposit control additives, or more than one of these functions. In an embodiment the oil-soluble transition metal-containing compound may be an oil-soluble titanium compound, such as a titanium (IV) alkoxide. Among the titanium containing compounds that may be used in, or which may be used for preparation of the oils-soluble materials of, the disclosed technology are various Ti (IV) compounds such as titanium (IV) oxide; titanium (IV) sulfide; titanium (IV) nitrate; titanium (IV) alkoxides such as titanium methoxide, titanium ethoxide, titanium propoxide, titanium isopropoxide, titanium butoxide, titanium 2-ethylhexoxide; and other titanium compounds or complexes including but not limited to titanium phenates; titanium carboxylates such as titanium (IV) 2-ethyl-1-3-hexanedioate or titanium citrate or titanium oleate; and titanium (IV) (triethanolaminato)isopropoxide. Other forms of titanium encompassed within the disclosed technology include titanium phosphates such as titanium dithiophosphates (e.g., dialkyldithiophosphates) and titanium sulfonates (e.g., alkylbenzenesulfonates), or, generally, the reaction product of titanium compounds with various acid materials to form salts, such as oil-soluble salts. Titanium compounds can thus be derived from, among others, organic acids, alcohols, and glycols. Ti compounds may also exist in dimeric or oligomeric form, containing Ti—O—Ti structures. Such titanium materials are commercially available or can be readily prepared by appropriate synthesis techniques which will be apparent to the person skilled in the art. They may exist at room temperature as a solid or a liquid, depending on the particular compound. They may also be provided in a solution form in an appropriate inert solvent.

In one embodiment, the titanium can be supplied as a Ti-modified dispersant, such as a succinimide dispersant. Such materials may be prepared by forming a titanium mixed anhydride between a titanium alkoxide and a hydrocarbyl-substituted succinic anhydride, such as an alkenyl- (or alkyl) succinic anhydride. The resulting titanate-succinate intermediate may be used directly or it may be reacted with any of a number of materials, such as (a) a polyamine-based succinimide/amide dispersant having free, condensable —NH functionality; (b) the components of a polyamine-based succinimide/amide dispersant, i.e., an alkenyl- (or alkyl-) succinic anhydride and a polyamine, (c) a hydroxy-containing polyester dispersant prepared by the reaction of a substituted succinic anhydride with a polyol, aminoalcohol, polyamine, or mixtures thereof. Alternatively, the titanate-succinate intermediate may be reacted with other agents such as alcohols, aminoalcohols, ether alcohols, polyether alcohols or polyols, or fatty acids, and the product thereof either used directly to impart Ti to a lubricant, or else further reacted with the succinic dispersants as described above. As an example, 1 part (by mole) of tetraisopropyl titanate may be reacted with about 2 parts (by mole) of a polyisobutene-substituted succinic anhydride at 140-150° C. for 5 to 6 hours to provide a titanium modified dispersant or intermediate. The resulting material (30 g) may be further reacted with a succinimide dispersant from polyisobutene-substituted succinic anhydride and a polyethylenepolyamine mixture (127 grams+diluent oil) at 150° C. for 1.5 hours, to produce a titanium-modified succinimide dispersant.

Another titanium containing compound may be a reaction product of titanium alkoxide and $C_6$ to $C_{25}$ carboxylic acid. The reaction product may be represented by the following formula:

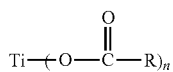

wherein n is an integer selected from 2, 3 and 4, and R is a hydrocarbyl group containing from about 5 to about 24 carbon atoms, or by the formula:

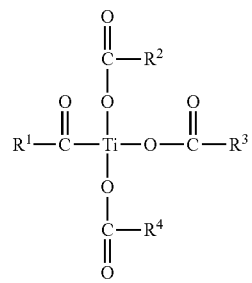

wherein each of $R^1$, $R^2$, $R^3$, and $R^4$ are the same or different and are selected from a hydrocarbyl group containing from about 5 to about 25 carbon atoms. Suitable carboxylic acids may include, but are not limited to caproic acid, caprylic acid, lauric acid, myristic acid, palmitic acid, stearic acid, arachidic acid, oleic acid, erucic acid, linoleic acid, linolenic acid, cyclohexanecarboxylic acid, phenylacetic acid, benzoic acid, neodecanoic acid, and the like.

In an embodiment the oil soluble titanium compound may be present in the lubricating oil composition in an amount to provide from 0 to 3000 ppm titanium by weight or 25 to about 1500 ppm titanium by weight or about 35 ppm to 500 ppm titanium by weight or about 50 ppm to about 300 ppm.

Viscosity Index Improvers

The lubricating oil compositions herein also may optionally contain one or more viscosity index improvers. Suitable viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. Viscosity index improvers may include star polymers and suitable examples are described in US Publication No. 20120101017A1.

The lubricating oil compositions herein also may optionally contain one or more dispersant viscosity index improvers in addition to a viscosity index improver or in lieu of a viscosity index improver. Suitable viscosity index improvers may include functionalized polyolefins, for example, ethylene-propylene copolymers that have been functionalized with the reaction product of an acylating agent (such as maleic anhydride) and an amine; polymethacrylates functionalized with an amine, or esterified maleic anhydride-styrene copolymers reacted with an amine. A commercially available dispersant viscosity index improver is HiTEC® 5777 available from Afton Chemical Corporation.

The total amount of viscosity index improver and/or dispersant viscosity index improver may be about 0 wt. % to about 20 wt. %, about 0.1 wt. % to about 15 wt. %, about 0.1 wt. % to about 12 wt. %, or about 0.5 wt. % to about 10 wt. %, of the lubricating oil composition.

Other Optional Additives

Other additives may be selected to perform one or more functions required of a lubricating fluid. Further, one or more of the mentioned additives may be multi-functional and provide functions in addition to or other than the function prescribed herein.

A lubricating oil composition according to the present disclosure may optionally comprise other performance additives. The other performance additives may be in addition to specified additives of the present disclosure and/or may comprise one or more of metal deactivators, viscosity index improvers, detergents, ashless TBN boosters, friction modifiers, antiwear agents, corrosion inhibitors, rust inhibitors, dispersants, dispersant viscosity index improvers, extreme pressure agents, antioxidants, foam inhibitors, demulsifiers, emulsifiers, pour point depressants, seal swelling agents and mixtures thereof. Typically, fully-formulated lubricating oil will contain one or more of these performance additives.

Suitable metal deactivators may include derivatives of benzotriazoles (typically tolyltriazole), dimercaptothiadiazole derivatives, 1,2,4-triazoles, benzimidazoles, 2-alkyldithiobenzimidazoles, or 2-alkyklithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxidepropylene oxide) polymers; pour point depressants including esters of maleic anhydride-styrene, polymethacrylates, polyacrylates or polyacrylamides.

Suitable foam inhibitors include silicon-based compounds, such as siloxane.

Suitable pour point depressants may include a polymethylmethacrylates or mixtures thereof. Pour point depressants may be present in an amount sufficient to provide from about 0 wt. % to about 1 wt. %, about 0.01 wt. % to about 0.5 wt. %, or about 0.02 wt. % to about 0.04 wt. % based upon the final weight of the lubricating oil composition.

Suitable rust inhibitors may be a single compound or a mixture of compounds having the property of inhibiting corrosion of ferrous metal surfaces. Non-limiting examples of rust inhibitors useful herein include oil-soluble high molecular weight organic acids, such as 2-ethylhexanoic acid, lauric acid, myristic acid, palmitic acid, oleic acid, linoleic acid, linolenic acid, behenic acid, and cerotic acid, as well as oil-soluble polycarboxylic acids including dimer and trimer acids, such as those produced from tall oil fatty acids, oleic acid, and linoleic acid. Other suitable corrosion inhibitors include long-chain alpha, omega-dicarboxylic acids in the molecular weight range of about 600 to about 3000 and alkenylsuccinic acids in which the alkenyl group contains about 10 or more carbon atoms such as, tetrapropenylsuccinic acid, tetradecenylsuccinic acid, and hexadecenylsuccinic acid. Another useful type of acidic corrosion inhibitors are the half esters of alkenyl succinic acids having about 8 to about 24 carbon atoms in the alkenyl group with alcohols such as the polyglycols. The corresponding half amides of such alkenyl succinic acids are also useful. A useful rust inhibitor is a high molecular weight organic acid. In some embodiments, an engine oil is devoid of a rust inhibitor.

The rust inhibitor, if present, can be used in an amount sufficient to provide about 0 wt. % to about 5 wt. %, about 0.01 wt. % to about 3 wt. %, about 0.1 wt. % to about 2 wt. %, based upon the final weight of the lubricating oil composition.

In general terms, a suitable crankcase lubricant may include additive components in the ranges listed in the following table.

TABLE 1

| Component | Wt. % (Suitable Embodiments) | Wt. % (Suitable Embodiments) |
| --- | --- | --- |
| Dispersant(s) | 0.1-20.0 | 1.0-10.0 |
| Antioxidant(s) | 0.1-5.0 | 0.01-3.0 |
| Detergent(s) | 0.1-15.0 | 0.2-8.0 |
| Ashless TBN booster(s) | 0.0-1.0 | 0.01-0.5 |
| Corrosion inhibitor(s) | 0.0-5.0 | 0.0-2.0 |
| Metal dihydrocarbyldithiophosphate(s) | 0.1-6.0 | 0.1-4.0 |

TABLE 1-continued

| Component | Wt. % (Suitable Embodiments) | Wt. % (Suitable Embodiments) |
| --- | --- | --- |
| Ash-free phosphorus compound(s) | 0.0-6.0 | 0.0-4.0 |
| Antifoaming agent(s) | 0.0-5.0 | 0.001-0.15 |
| Antiwear agent(s) | 0.0-1.0 | 0.0-0.8 |
| Pour point depressant(s) | 0.0-5.0 | 0.01-1.5 |
| Viscosity index improver(s) (on a liquid basis) | 0.0-25.0 | 0.1-15.0 |
| Dispersant viscosity index improver(s) | 0.0-10.0 | 0.0-5.0 |
| Friction modifier(s) | 0.01-5.0 | 0.05-2.0 |
| Base oil(s) | Balance | Balance |
| Total | 100 | 100 |

The percentages of each component above represent the weight percent of each component, based upon the weight of the final lubricating oil composition. The remainder of the lubricating oil composition consists of one or more base oils.

Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent). Preferably, each of the additives is soluble or oil-soluble. By "soluble" or "oil-soluble" it is meant that the molybdenum compound is oil-soluble or capable of being solubilized under normal blending or use conditions into the lubrication oil or diluent for the concentrate.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

Tests to Assess Kinematic Viscosity and Rate of Oxidation

Lubricant compositions are prepared in base oil with the compositions indicated in Table 1 above. In addition to the materials noted in Table 1, each of the tested lubricant compositions is prepared to have varying amounts of one or more dispersants and two or more antioxidants.

The GFC Lu-49-T-11 test, included in the ACEA 2012 specifications was used to assess aging of the lubricating composition through oxidation in presence of biofuel. The lubricating composition to be tested is maintained at 170° C., in the presence of iron catalyst (100 ppm of Iron), under constant flow of air of 10 L/h and with addition of fuel during the test from 72 hours. The test is over 144 hours. A reference fuel, GOPSA 10LUB (a diesel fuel containing 10% Methyl Esters from Vegetable oils) is used during the test.

For example, a typical test mixture is produced by mixing (i) 150 g of the lubricant composition under test, and (ii) 100 ppm of iron as part of a prepared catalyst. The prepared catalyst can be prepared by weighing 1.9023 g of the catalyst anhydrous iron (III) acetylacetonate, pouring it in a 100 mL gauged phial with some chloroform, and filling to the gauge line with chloroform. 5 mL of the prepared catalyst should provide the 100 ppm of iron required by the test.

For testing, the flask with the test mixture is placed into a heated silicon bath maintained at 170° C. Air is blown into an air inlet tube connected to the flask at 10 L/hr. The air flow should be sufficient to homogeneously mix the lubricant being tested with the catalyst. Samples of the test mixture, 20 mL each, are removed at 72, 96, 120, and 144 hours for evaluation. When the sample is removed at 72 hours, 26.4 g of the reference fuel are added to the test mixture, with the 96 hour sample, 9.0 g of reference fuel is added, and with the 120 hour sample, 8.3 g of reference fuel is added. The removed samples are analyzed for kinematic viscosity at 100° C. The typical test duration is 144 hours.

The kinematic viscosity (KV) is determined for all samples at 100° C. in accordance with the ASTM D445 Standard or equivalent (e.g., ISO 3104, AFNORNF T60 100, IP 71). The absolute viscosity change ($DKV_t$) at time t is calculated by subtracting the SOT-sample viscosity ($KV_{SOT}$) from the corresponding runtime-sample viscosity ($KV_t$). The relative viscosity change ($RKV_t$ or delta KV) is calculated by dividing the $DKV_t$ value by $KV_{SOT}$, and multiplying the result by 100. The $RKV_t$ values are therefore expressed in percent (%). The delta KV after 144 hours is determined with a passing value of less than approximately 200%. However, since values up to 250% may be within the margin of error for repeat tests, those values will also be considered to be a passing value in the Comparative Examples below.

Each of the lubricant compositions listed in the tables below includes, inter alia, (i) one, two, or three dispersants selected from Dispersant A, Dispersant B, and/or Dispersant C in the amounts indicated in Tables 3 and 4, and (ii) an antioxidant, or combination of antioxidants, which vary in amounts between the two Comparative Examples, and will be identified within each comparative example. In all of the examples, the amounts and types of additional engine oil components are held constant and these components included ZDDP, detergent, antifoamant, base oil, and viscosity modifier.

Two different antioxidants were used in Example 1 and three different antioxidants were used in Example 2. The antioxidants used in the examples include an aminic antioxidant, a phenolic antioxidant, and a molybdenum-containing antioxidant.

Dispersant A is a reaction product of (i) PIBSA having a PIB group with a number average molecular weight of about 1300 and (ii) at least one polyamine, and post treated with boric acid.

Dispersant B is a reaction product of (i) blended polyisobutenyl succinic anhydride (PIBSA) having a polyisobutenyl (PIB) group with a number average molecular weight between about 1400 and about 1600, and (ii) at least one polyamine.

Dispersant C is a reaction product of (i) PIBSA having a PIB group with a number average molecular weight of about 2300, and (ii) at least one polyamine.

EXAMPLES

Dispersant A can be considered to be a low molecular weight dispersant (dispersants with a polyisobutenyl (PIB) group with a number average molecular weight (Mn) less than or equal to 1300), whereas Dispersants B and C can be considered to be high molecular weight dispersants (dispersants with a polyisobutenyl (PIB) group with a number average molecular weight (Mn) greater than 1300). The amount of high molecular weight dispersants B-C used in the experimental lubricating compositions was in the range of 0.1-10 wt. %, based on a total weight of the lubricant composition and the total amount of dispersant used in each of the examples was in the range of 1-10 wt. %, based on a total weight of the lubricant composition.

An antioxidant composition was also added to the lubricant compositions in this Example. The antioxidant amounts were kept the same for all of the Examples, and included, 0.8 wt. % of the aminic antioxidant and 0.5 wt. % of the phenolic antioxidant, based on the wt. % of the total lubricating composition. The delta KV value after 144 hours for each of the compositions, as well as the ratio of amounts, % N activity, and molecular weight provided by the sum of Dispersants A and B with respect to the total dispersant is shown in Table 2.

TABLE 2

| Component | Examples | | | |
|---|---|---|---|---|
| | 1 | 2 | 3 | CE1 |
| Dispersant A | Present | Present | 0 | Present |
| Dispersant B | Present | Present | Present | Present |
| Dispersant C | Present | Present | Present | 0 |
| Ratio of $\frac{B+C}{\text{total dispersant}}$ | 0.66 | 0.76 | 1 | 0.61 |
| Nitrogen % ratio of $\frac{B+C}{\text{total dispersant}}$ | 0.62 | 0.72 | 1 | 0.53 |
| Molecular weight ratio of $\frac{B+C}{\text{total dispersant}}$ | 0.72 | 0.81 | 1 | 0.66 |
| Delta KV (144 hours), % | 95 | 246 | 176 | SOLID |

The test results in Table 2 show that Examples 1, 2 and 3 which are the only compositions having acceptable delta KV(144) values are those having a ratio of the sum of dispersants B+C to the total amount of dispersant of greater than 0.66:1. This ratio of high molecular weight dispersants can cause the corresponding lubricant composition to exhibit the above-mentioned unexpected beneficial viscosity characteristics.

Experimental lubricating compositions were made using the amounts of components shown above in Table 1. Dispersant A can be considered to be a low molecular weight dispersant, whereas Dispersants B and C can be considered to be high molecular weight dispersants. Table 3 shows the amounts of each of the dispersants A-C that are contained in each of these experimental lubricating compositions.

An additional antioxidant was added to the lubricant compositions in this Example. The antioxidant amounts were kept the same for all of the Examples, and included, 1.0 wt. % of the aminic antioxidant and 0.5 wt. % of the phenolic antioxidant, and 0.1 wt. % of the molybdenum-containing antioxidant, based on the wt. % of the total lubricating composition. The delta KV value after 144 hours as measured using the above-described process for each of the compositions is shown in Table 3.

TABLE 3

| Components | CE2 | Examples 4 | 5 | 6 | 7 |
|---|---|---|---|---|---|
| Dispersant A | Present | Present | Present | Present | Present |
| Dispersant B | Present | Present | Present | Present | Present |
| Dispersant C | Present | Present | Present | 0 | Present |
| Ratio of $\frac{B+C}{\text{total dispersant}}$ | 0.33 | 0.42 | 0.61 | 0.61 | 0.76 |
| Nitrogen % ratio of $\frac{B+C}{\text{total dispersant}}$ | 0.32 | 0.40 | 0.57 | 0.53 | 0.72 |
| Molecular weight ratio of $\frac{B+C}{\text{total dispersant}}$ | 0.42 | 0.51 | 0.68 | 0.66 | 0.81 |
| Delta KV (144 hours), % | SOLID | 121 | 47 | 107 | 37 |

In Table 3, the test results for Examples 4-7 show that with the addition of a molybdenum-containing antioxidant, the ratio of Dispersants B and C to the total amount of dispersant can be reduced. All of the delta KV(144) values for the compositions having a ratio of the sum of dispersants B+C to the total amount of dispersant of greater than 0.42:1. This ratio of high molecular weight dispersants (dispersants with a PIB group greater than 1300 $MW_n$) can cause the corresponding lubricant composition to exhibit the above-mentioned unexpected beneficial viscosity characteristics.

TABLE 4

| Components | Examples 8 | CE3 |
|---|---|---|
| Dispersant A | Present | Present |
| Dispersant B | Present | Present |
| Dispersant C | Present | 0 |
| Ratio of $\frac{B+C}{\text{total dispersant}}$ | 0.66 | 0.61 |
| Nitrogen % ratio of $\frac{B+C}{\text{total dispersant}}$ | 0.62 | 0.53 |
| Molecular weight ratio of $\frac{B+C}{\text{total dispersant}}$ | 0.72 | 0.66 |
| Delta KV (144 hours), % | 95 | 339 |

Example 8 has less antioxidant than comparative example 3. The results in Table 4 for Example 8 and Comparative Example 3 show that by using an appropriate level of higher molecular weight dispersant, it is possible to achieve a better result in a formulation with less total antioxidant. This may have beneficial effects in other areas, for example total formulation cost.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentee does not intend to dedicate any disclosed embodiments to the public, and to the extent any disclosed modifications or alterations may not literally fall within the scope of the claims, they are considered to be part hereof under the doctrine of equivalents.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

The invention claimed is:

1. A method of lubricating an engine fueled with biodiesel, the method comprising supplying a lubricant composition to the engine wherein the lubricant composition is contaminated with the biodiesel during operation of the engine, said lubricant composition comprising:
   (I) greater than 50 percent by weight of a base oil, based on a total weight of the lubricant composition;
   (II) a dispersant composition comprising:
      i) dispersant (A) comprising one or more reaction products of at least one polyisobutenyl succinic acid or anhydride having a polyisobutenyl group with a number average molecular weight that is from 500 up to 1300, and at least one polyamine;
      ii) dispersant (B) comprising one or more reaction products of at least one polyisobutenyl succinic acid or anhydride having a polyisobutenyl group with a number average molecular weight of from greater than 1300 up to 1600, and at least one polyamine; and
      iii) dispersant (C) comprising one or more reaction products of at least one polyisobutenyl succinic acid or anhydride having a polyisobutenyl group with a number average molecular weight of about 2300, and at least one polyamine;
   wherein the lubricant composition does not include any dispersant in addition to dispersants A, B and C, and comprises from about 0.1 wt. % to about 20 wt. % of total dispersant, based on the total weight of the lubricant composition; wherein dispersants (A)—(C) are not post-treated with a combination of a phenol and an aldehyde;
   (III) about 0.4 wt. % to about 2.5 wt. % of a phenolic antioxidant, based on the total weight of the lubricant composition; and
   (IV) about 0.3 wt. % to about 1.5 wt. % of an aminic antioxidant, based on the total weight of the lubricant composition; wherein
   a weight ratio of the phenolic antioxidant to the aminic antioxidant is from about 0.3:0.8 to about 0.8:0.3; wherein
   the dispersants (B) and (C) are present in a combined amount of from about 0.1 wt. % to about 10 wt. %, based on a total weight of the lubricant composition;
   a weight ratio of the combined amount of the dispersants (B) and (C) to the total weight of the dispersant composition ranges from about 0.66:1 to about 0.76:1; and
   a ratio of the weight percentage of nitrogen contributed by the combined amount of the dispersants (B) and (C) to the weight percentage of nitrogen of the total dispersant composition is from about 0.62:1 to 0.72:1.

2. The method of claim 1, wherein the lubricant composition is devoid of sulfurized antioxidants.

3. The method of claim 1, further comprising an amount of a molybdenum containing compound sufficient to provide from about 0.5 ppm to about 2000 ppm of molybdenum to the lubricant composition.

4. The method of claim 1, wherein the weight ratio of the phenolic antioxidant to the aminic antioxidant is from about 0.3:0.8 to about 0.7:0.8.

5. The method of claim 1, wherein a ratio of the number average molecular weight of the combined amount of the dispersants (B) and (C) to the number average molecular weight of the total dispersant composition is from about 0.72:1 to 0.81:1.

6. The method of claim 1, wherein the lubricant composition comprises about 0.1 wt. % to about 15 wt. % of the total dispersant, based on the total weight of the lubricant composition, and the dispersant (B) comprises one or more reaction products of at least one polyisobutenyl succinic acid or anhydride having a polyisobutenyl group with a number average molecular weight greater than 1400, and at least one polyamine.

7. A method of lubricating an engine fueled with biodiesel, the method comprising supplying a lubricant composition to the engine wherein the lubricant composition is contaminated with the biodiesel during operation of the engine, said lubricant composition comprising:
   (I) greater than 50 percent by weight of a base oil, based on a total weight of the lubricant composition;
   (II) about 0.4 to about 2.5 wt. % of a phenolic antioxidant, based on the total weight of the lubricant composition;
   (III) about 0.3 to about 1.5 wt. % of an aminic antioxidant, based on the total weight of the lubricant composition;
   (IV) a sufficient amount of a molybdenum-containing antioxidant that is soluble, suspendable, dissolvable, or stably dispersible in oil to provide from about 5 ppm to about 550 ppm of molybdenum to the lubricant composition, based on the total weight of the lubricant composition; and
   (V) a dispersant composition comprising:
      i) dispersant (A) comprising one or more reaction products of at least one polyisobutenyl succinic acid or anhydride having a polyisobutenyl group with a number average molecular weight that is from 500 up to 1300, and at least one polyamine; and
      ii) dispersant (B) comprising one or more reaction products of at least one polyisobutenyl succinic acid or anhydride having a polyisobutenyl group with a number average molecular weight of from greater than 1300 to about 1600, and at least one polyamine;
      iii) dispersant (C) comprising one or more reaction products of at least one polyisobutenyl succinic acid or anhydride having a polyisobutenyl group with a number average molecular weight of about 2300;
   wherein dispersants (A)—(C) are not post-treated with a combination of a phenol and an aldehyde, wherein the lubricant composition does not include any dispersant in addition to dispersants A, B and C
   wherein a weight ratio of the combined amount of the dispersants (B) and (C) to the total weight of the dispersant composition ranges from about 0.42:1 to about 0.76:1;
   the combined amount of the dispersants (B) and (C) is from about 0.1 wt. % to about 10 wt. %, based on the total weight of the lubricant composition;
   a weight ratio of phenolic antioxidant to aminic antioxidant to molybdenum-containing antioxidant is from 0.5:1.5:0.25 to 1:0.05:0.25; and a ratio of the weight percentage of nitrogen contributed by the combined amount of the dispersants (B) and (C) to the weight percentage of nitrogen of the dispersant composition is from about 0.40:1 to 0.72:1.

8. The method of claim 7, wherein the weight ratio of the phenolic antioxidant to aminic antioxidant to molybdenum-containing antioxidant is approximately 0.5:1:0.1.

9. The method of claim 7, wherein a ratio of the number average molecular weight of the combined amount of the dispersants (B) and (C) to the number average molecular weight of the total dispersant composition is from about 0.5:1 to less than 0.81:1.

10. The method of claim 7, wherein the lubricant composition comprises about 0.1 wt. % to about 20 wt. % of the total dispersant, based on the total weight of the lubricant composition, and the dispersant (B) comprises one or more reaction products of at least one polyisobutenyl succinic acid or anhydride having a polyisobutenyl group with a number average molecular weight greater than 1400, and at least one polyamine.

11. A method of lubricating an engine fueled with biodiesel, the method comprising supplying a lubricant composition to the engine wherein the lubricant composition is contaminated with the biodiesel during operation of the engine,
said lubricant composition comprising:
greater than 50 percent by weight of a base oil, based on a total weight of the lubricant composition;
a dispersant composition comprising at least two dispersants, said dispersant composition comprising:
  i) dispersant (A) comprising one or more reaction products of at least one polyisobutenyl succinic acid or anhydride having a polyisobutenyl group with a number average molecular weight that is from 500 up to 1300, and at least one polyamine;
  ii) dispersant (B) comprising one or more reaction products of at least one polyisobutenyl succinic acid or anhydride having a polyisobutenyl group with a number average molecular weight from greater than 1400 up to 1600, and at least one polyamine; and
  iii) dispersant (C) comprising one or more reaction products of at least one polyisobutenyl succinic acid or anhydride having a polyisobutenyl group with a number average molecular weight of about 2300, and at least one polyamine;
wherein dispersants (A)—(C) are not post-treated with a combination of a phenol and an aldehyde, wherein the lubricant composition does not include any dispersant in addition to dispersants A, B and C
at least one ashless antioxidant selected from the group consisting of about 0.4 wt. % to about 2.5 wt. % of a phenolic antioxidant and about 0.3 to about 1.5 wt. % of an aminic antioxidant, said weight percentages being based on a total weight of the lubricant composition;
wherein a ratio of the weight percentage of nitrogen contributed by the combination of dispersants (B) and (C) to the weight percentage of nitrogen of the total dispersant composition is from about 0.62:1 to 0.72:1;
wherein a weight ratio of the combined amount of the dispersants (B) and (C) to the total weight of the dispersant composition ranges from about 0.66:1 to about 0.76:1;
the lubricant composition comprises about 0.1 wt. % to about 20 wt. % of the total dispersant, based on the total weight of the lubricant composition, and
a combined amount of the dispersants (B) and (C) is from about 0.1 wt. % to about 10 wt. %, based on the total weight of the lubricant composition.

12. A method of lubricating an engine fueled with biodiesel, the method comprising supplying a lubricant composition to the engine wherein the lubricant composition is contaminated with the biodiesel during operation of the engine,
the lubricant composition comprising:
greater than 50 percent by weight of a base oil, based on a total weight of the lubricant composition;
at least one molybdenum-containing antioxidant in an amount sufficient to provide from about 5 ppm to about 550 ppm of molybdenum to the lubricant composition, based on the total weight of the lubricant composition; and
a dispersant composition comprising:
  i) dispersant (A) comprising one or more reaction products of at least one polyisobutenyl succinic acid or anhydride having a polyisobutenyl group with a number average molecular weight that is from 500 up to 1300, and at least one polyamine;
  ii) dispersant (B) comprising one or more reaction products of at least one polyisobutenyl succinic acid or anhydride having a polyisobutenyl group with a number average molecular weight of from greater than 1400 up to 1600, and at least one polyamine; and
  iii) dispersant (C) comprising one or more reaction products of at least one polyisobutenyl succinic acid or anhydride having a polyisobutenyl group with a number average molecular weight of about 2300;
wherein dispersants (A)—(C) are not post-treated with a combination of a phenol and an aldehyde, wherein the lubricant composition does not include any dispersant in addition to dispersants A, B and C
wherein a ratio of the weight percentage of nitrogen contributed by the combination of the dispersants (B) and (C) to the weight percentage of nitrogen of the dispersant composition is from about 0.40:1 to 0.72:1,
wherein a weight ratio of the combined amount of the dispersants (B) and (C) to the total weight of the dispersant composition ranges from about 0.42:1 to about 0.76:1;
the lubricant composition comprises about 0.1 wt. % to about 20 wt. % of the total dispersant, based on the total weight of the lubricant composition, and
the combined amount of the dispersants (B) and (C) is from about 0.1 wt. % to about 10 wt. %, based on the total weight of the lubricant composition.

13. The method of claim 7, wherein the antioxidants are present in a total amount of about 0.1 wt. % to about 10 wt. %, based on the total weight of the lubricant composition.

14. The method of claim 1, wherein the lubricant composition comprises from about 3 wt. % to about 15 wt. % of the total dispersant.

15. The method of claim 1, wherein the lubricant composition comprises from about 3 wt. % to about 10 wt. % of the total dispersant.

16. The method of claim 7, wherein the lubricant composition comprises from about 3 wt. % to about 15 wt. % of the total dispersant.

17. The method of claim 7, wherein the lubricant composition comprises from about 3 wt. % to about 10 wt. % of the total dispersant.

18. The method of claim 7, wherein the dispersant (A) comprises at least one dispersant obtained from a polyisobutenyl succinic acid or anhydride having a polyisobutenyl group with a number average molecular weight between 900 to 1300.

19. The method of claim 7, wherein the molybdenum-containing antioxidant is present in an amount sufficient to provide from about 5 ppm to about 250 ppm of molybdenum to the lubricant composition, based on the total weight of the lubricant composition.

* * * * *